US009069772B2

(12) United States Patent
Callery et al.

(10) Patent No.: US 9,069,772 B2
(45) Date of Patent: Jun. 30, 2015

(54) SMART SLIDE CREATION AND PRESENTATION

(75) Inventors: Matthew J. Callery, Shrub Oak, NY (US); Michael Desmond, White Plains, NY (US); Sophia Krasikov, Katonah, NY (US); Harold L. Ossher, South Salem, NY (US); Edith Schonberg, New York, NY (US); Ian D. Simmonds, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/885,684

(22) Filed: Sep. 20, 2010

(65) Prior Publication Data

US 2011/0302494 A1 Dec. 8, 2011

Related U.S. Application Data

(60) Provisional application No. 61/351,486, filed on Jun. 4, 2010.

(51) Int. Cl.
*G06F 3/00* (2006.01)
*G06F 17/30* (2006.01)
*G06F 17/21* (2006.01)

(52) U.S. Cl.
CPC ........ *G06F 17/30056* (2013.01); *G06F 17/211* (2013.01)

(58) Field of Classification Search
CPC .................................................... G06F 15/177
USPC ................................................. 715/730, 731
See application file for complete search history.

(56) References Cited

U.S. PATENT DOCUMENTS

| 6,091,408 A * | 7/2000 | Treibitz et al. | 715/753 |
|---|---|---|---|
| 6,493,744 B1 * | 12/2002 | Emens et al. | 709/203 |
| 7,221,865 B2 * | 5/2007 | Nonaka | 396/287 |
| 2002/0004803 A1 * | 1/2002 | Serebrennikov | 707/513 |
| 2007/0294610 A1 * | 12/2007 | Ching | 715/500 |
| 2008/0148153 A1 * | 6/2008 | Lee et al. | 715/730 |
| 2009/0037821 A1 * | 2/2009 | O'Neal et al. | 715/732 |
| 2010/0218100 A1 * | 8/2010 | Simon et al. | 715/731 |
| 2011/0093802 A1 * | 4/2011 | Gaucas et al. | 715/764 |

\* cited by examiner

*Primary Examiner* — Doon Chow
*Assistant Examiner* — Le Nguyen
(74) *Attorney, Agent, or Firm* — Harrington & Smith; Louis J. Percello

(57) ABSTRACT

Disclosed is a computer-implemented method to create a presentation having at least one sheet, where each sheet contains one or more visual elements, as well as a system and computer program embodied on a computer-readable storage medium. The method includes, in response to input from a user, representing visual elements as depictions in a model, where each depiction depicts a single item in the model, where each item is a unit of information with a unique identifier, where each item can be depicted by at least one depiction and each depiction defines the visual representation of the item's information via the visual element. The method further includes, in response to a change to an item made by altering the visual element associated with the depiction of the item, automatically propagating the change to the item to all other depictions of the item across all sheets of the presentation. The method further includes updating the associated visual elements to reflect the change to the item.

22 Claims, 20 Drawing Sheets

FIG. 6A

SMART SLIDE CREATION AND PRESENTATION

CLAIM OF PRIORITY FROM COPENDING PROVISIONAL PATENT APPLICATION

This patent application claims priority under 35 U.S.C. §119(e) from Provisional Patent Application No. 61/351,486, filed Jun. 4, 2010, the disclosure of which is incorporated by reference herein in its entirety.

TECHNICAL FIELD

The exemplary embodiments of this invention relate generally to presentation software displaying sheets of a presentation on a visual display, such as a computer screen.

BACKGROUND

A presentation program can be generally considered as being a computer software package used to display information on a particular topic. The information can be displayed through "slides" (also known as "sheets" or "foils") on a display screen. More recently a presentation paradigm has emerged where a user can zoom in and out on portions of an infinitely expandable "canvas", rather than presenting a linear sequence of slides.

A presentation program usually combines three major functions: an editor that allows text to be inserted and formatted, a module for inserting and manipulating graphical images, and a slide-show system to display the contents.

Currently available presentation applications generally have broad applicability. They are typically easy to learn, they generally do not constrain the order in which the user develops a presentation, and they can provide narrative structure in the same medium used in the final presentation. However, even with all of these features consistency management across slides is the responsibility of a user.

As currently available presentation applications lack a meta-model and semantic support, making a change to the content or styling of a sheet does not result in relevant changes being made to all related sheets. The end result is that every change, no matter how small, must be made manually to other locations and sheets affected by the change.

Also, while a presentation application is primarily designed for displaying ideas, frequently users work out those ideas in the application itself. In other words, they use sheets to collect data, classify the data, establish some relationships among data elements, and only then craft a presentation sheet that is included in the slide show. The unused sheets are typically "stored" at the end of the presentation, like additional cards piled on at the end of a deck, and simply not shown to the audience. Keeping all of the sheets in one common "deck" encumbers both the workflow and the presentation itself.

Some currently available presentation applications allow for layout templates that provide a consistent "look" to the slides in a presentation. The color of the background, the size of the headings and other stylistic features can be pre-selected by a user who wishes to apply these layout specifics to all the sheets of a presentation. However, in accordance with conventional practice a user cannot create a template on the basis of the content, i.e., a template that can be applied to all items in a predefined category.

BRIEF SUMMARY

The foregoing and other problems are overcome, and other advantages are realized, in accordance with the exemplary embodiments of this invention.

In accordance with a first non-limiting aspect of this invention there is provided a computer-implemented method to create a presentation comprised of at least one sheet, where each sheet contains one or more visual elements. The method includes, in response to input from a user, representing visual elements as depictions in a model, where each depiction depicts a single item in the model, where each item is a unit of information with a unique identifier, where each item can be depicted by at least one depiction and each depiction defines the visual representation of the item's information via the visual element. The method further includes, in response to a change to an item made by altering the visual element associated with the depiction of the item, automatically propagating the change to the item to all other depictions of the item across all sheets of the presentation. The method further includes updating the associated visual elements to reflect the change to the item.

In accordance with another non-limiting aspect of this invention there is provided a computer-readable medium that stores machine executable instructions. Execution of the instructions results in performing operations that comprise creating a presentation comprised of at least one sheet, each sheet containing one or more visual elements, where in response to input from a user, representing visual elements as depictions in a model, where each depiction depicts a single item in the model, where each item is a unit of information with a unique identifier, where each item can be depicted by at least one depiction and each depiction defines the visual representation of the item's information via the visual element. There is a further operation, performed in response to a change to an item made by altering the visual element associated with the depiction of the item, of automatically propagating the change to the item to all other depictions of the item across all sheets of the presentation. There is another operation of updating the associated visual elements to reflect the change to the item.

In accordance with yet another non-limiting aspect of this invention there is provided a system configured to execute a presentation application to create a presentation comprised of at least one sheet, where each sheet contains one or more visual elements. The system comprises at least one data processor coupled with at least one computer-readable medium that stores machine executable instructions. Execution of the instructions by the at least one data processor results in performing operations that comprise, in response to receiving input generated by a user with a user interface coupled to the at least one data processor, representing visual elements that are displayable to the user via the user interface as depictions in a model, where each depiction depicts a single item in the model, where each item is a unit of information with a unique identifier, where each item can be depicted by at least one depiction and each depiction defines the visual representation of the item's information via the visual element; in response to a change to an item made by altering the visual element associated with the depiction of the item, automatically propagating the change to the item to all other depictions of the item across all sheets of the presentation; and updating the associated visual elements to reflect the change to the item.

BRIEF DESCRIPTION OF THE SEVERAL VIEWS OF THE DRAWINGS

FIG. 6A illustrates the creation of a relation type "customer prefers" before creating an empty table.

DETAILED DESCRIPTION

The exemplary embodiments of this invention provide in one aspect thereof an extended and enhanced presentation application that provides at least the following novel features: consistency and coherency for changes in content and styling made across various sheets;

two separate areas in the work frame that are dedicated respectively to "work-book" sheets and to "presentation-book" sheets, where sheets can be copied or moved from one area to the other, and where only the "presentation-book" sheets are displayed during a slide show; and the simultaneous generation of additional sheets based on a single content-specific template.

A non-limiting aspect of this invention thus relates to the use of a content-based template that allows for multiple sheets to be generated simultaneously and automatically, thereby avoiding the problem of the user having to copy, paste and modify from sheet to sheet.

The exemplary embodiments are described below using a non-limiting example of a small distributor that supplies specialty kitchen and bath retailers. To assist the specialty retailers in competing with larger chain stores it is assumed that the distributor wants to better understand the needs of its buyers (retail store owners). To do this the distributor sends out a field representative to interview the storeowners. The results are to be presented to the distributor's executives, as well as to the suppliers, to help both manage costs and maximize profit.

Figure 1:
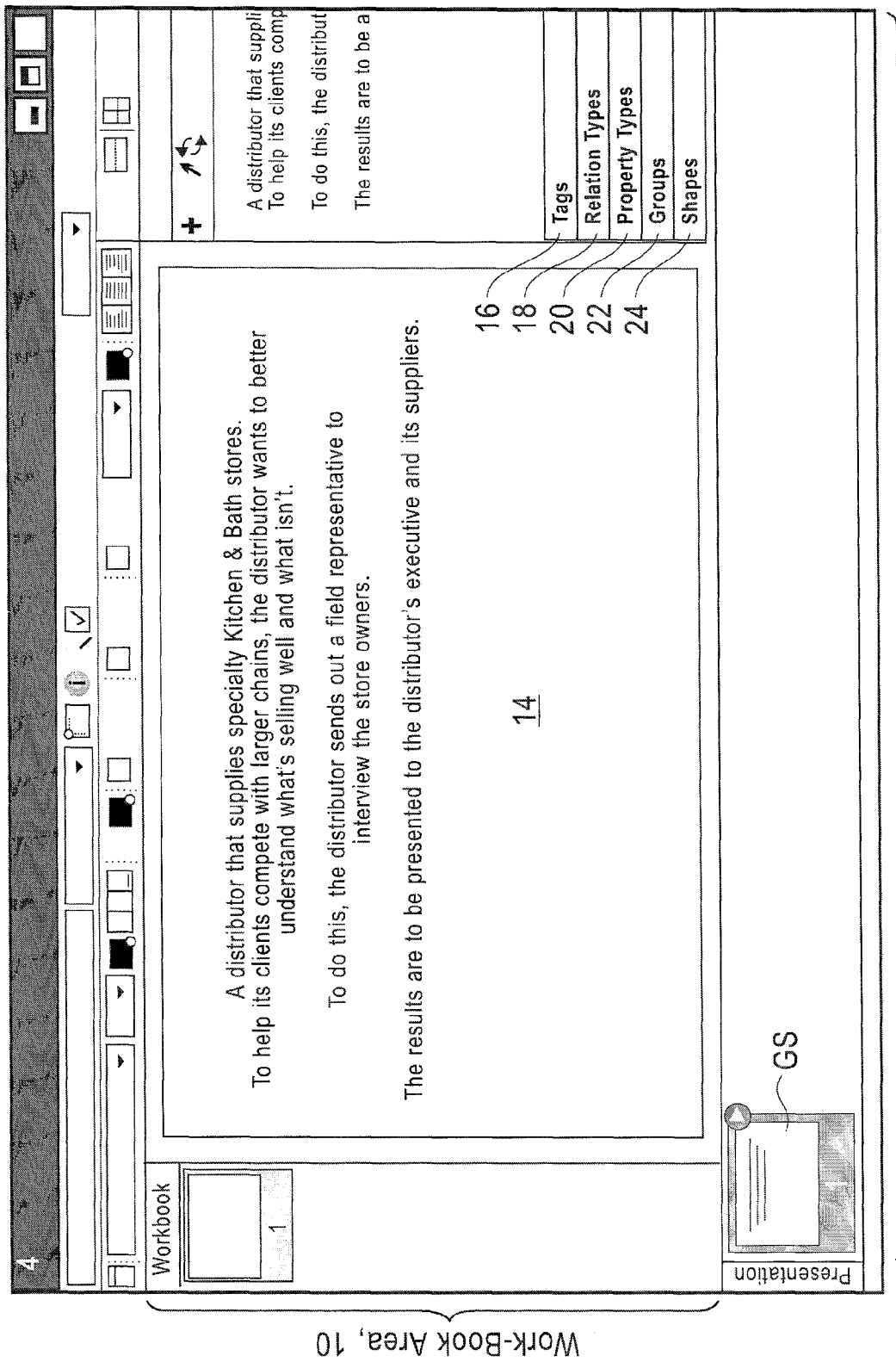
FIG. 1 depicts an output of a presentation application having "work book" and a "presentation book" screen areas.

It is assumed that the distributor has chosen to work with a presentation application that incorporates the exemplary embodiments of this invention. After launching the application the user is presented with a view as shown in FIG. 1 which allows the user to operate with a "work-book" 10 and a "presentation-book" 12, each being displayed in a separate and distinct screen area. Also provided is a composition/editing screen area 14, and a plurality of user selectable controls or buttons labeled Tags 16, Relation Types 18, Property Types 20, Groups 22 and Shapes 24, the use of at least some of which will made apparent below.

Assume that the user first inputs a goal he wants to achieve on the first sheet of the presentation. The first sheet, which may be referred to as a goal sheet (GS) in this example, is depicted in the presentation area 12.

Figure 2:
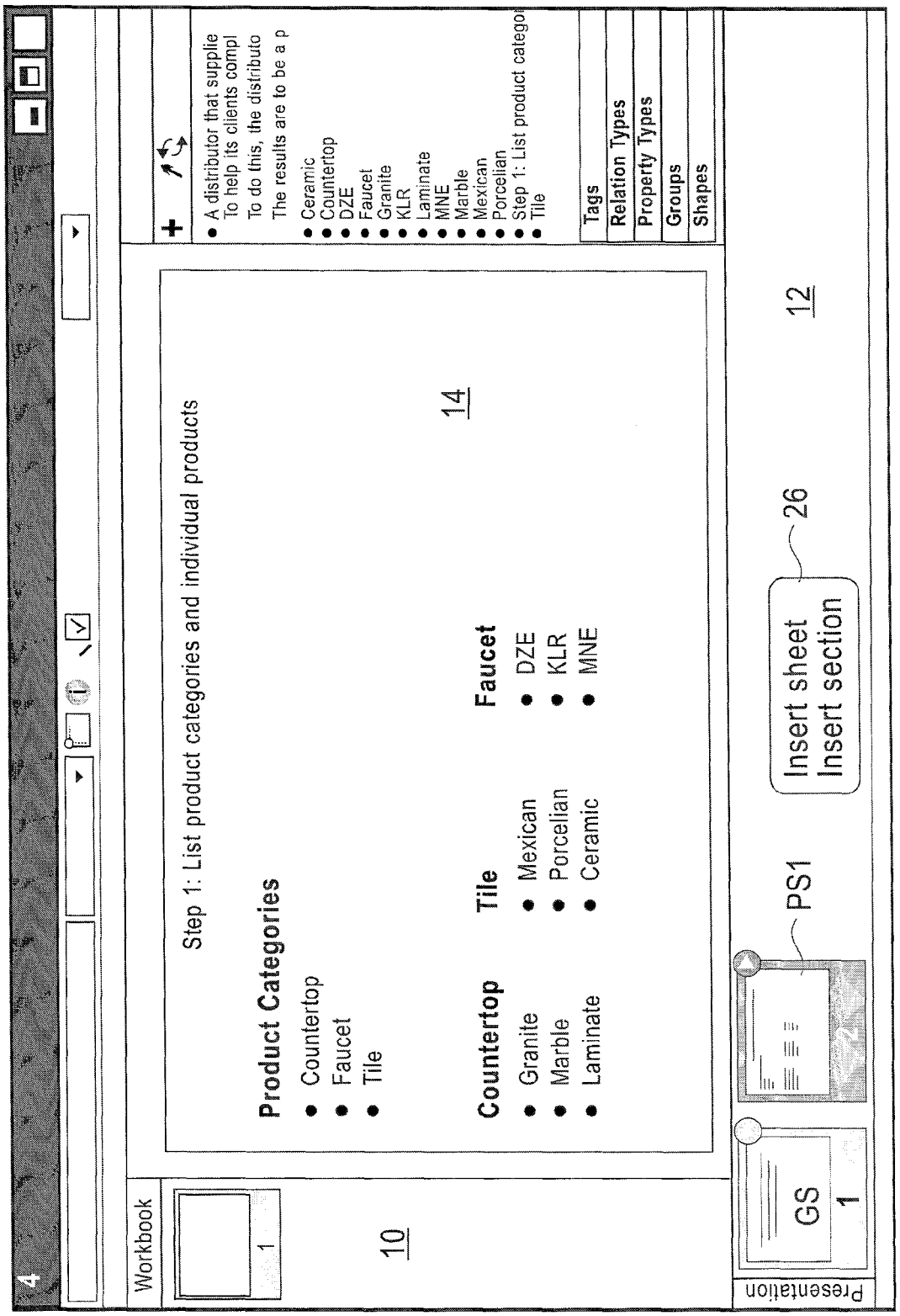
FIG. 2 shows a presentation sheet inserted into a Presentation.

As shown in FIG. 2 a next step inserts a first presentation sheet PS1 (not the goal sheet (GS)) into a Presentation. This is accomplished by the user creating an empty sheet by selecting "Insert sheet" in a context menu 26 within the presentation area. The user "fills" in the inserted sheet with four lists: a list with the product categories (Countertop, Tile, and Faucet), and three lists with products for each product category. In this exemplary case the countertop products are Granite, Marble and Laminate; the Tile products are Mexican, Porcelain and Ceramic; and the Faucet products are DZE, KLR and MNE.

Figure 3:
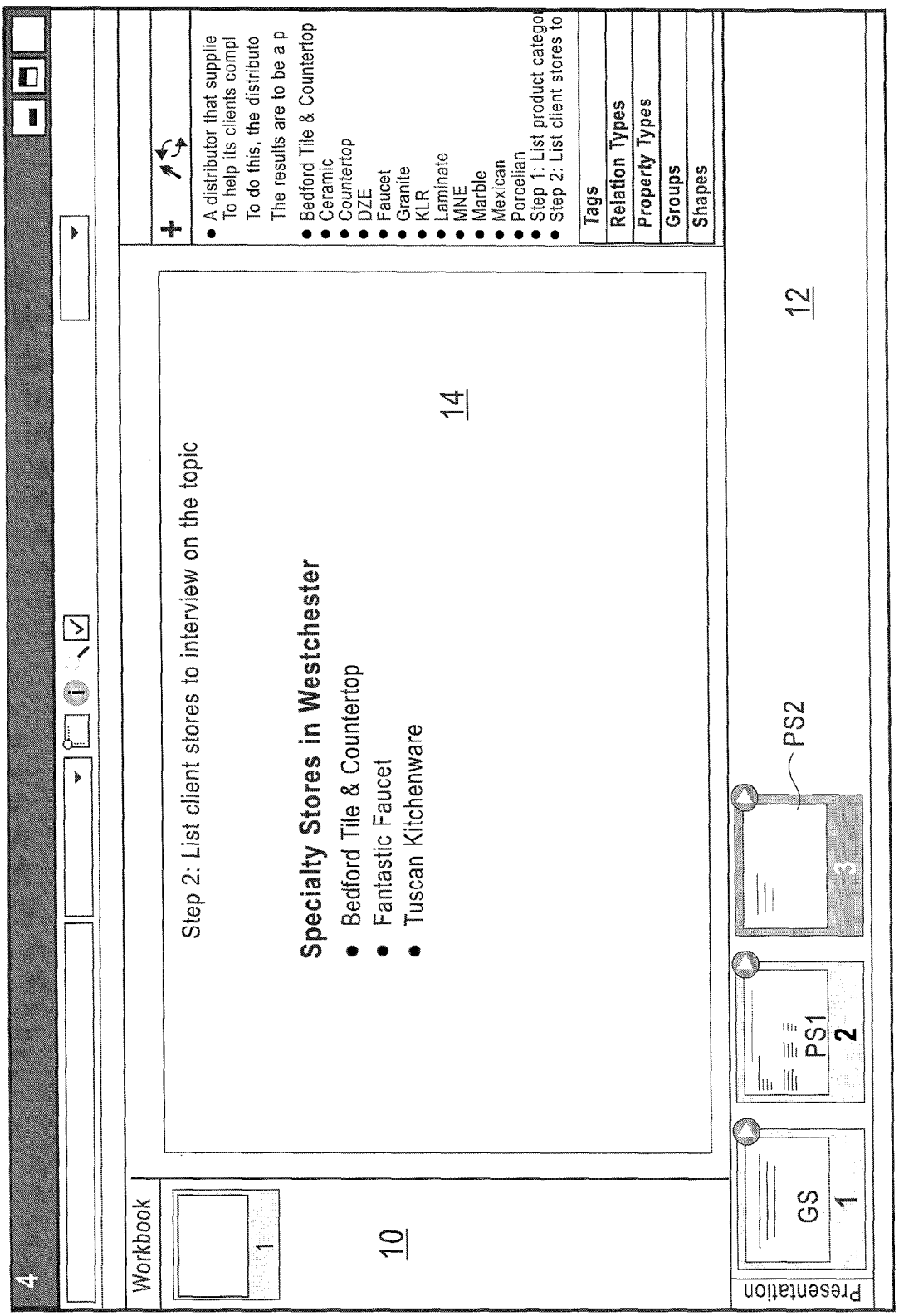
FIG. 3 shows a third sheet is inserted into the Presentation.

As is shown in FIG. 3, in a similar manner the user inserts a second presentation sheet (PS2) into the Presentation and creates a list with stores to interview.

Figure 4:
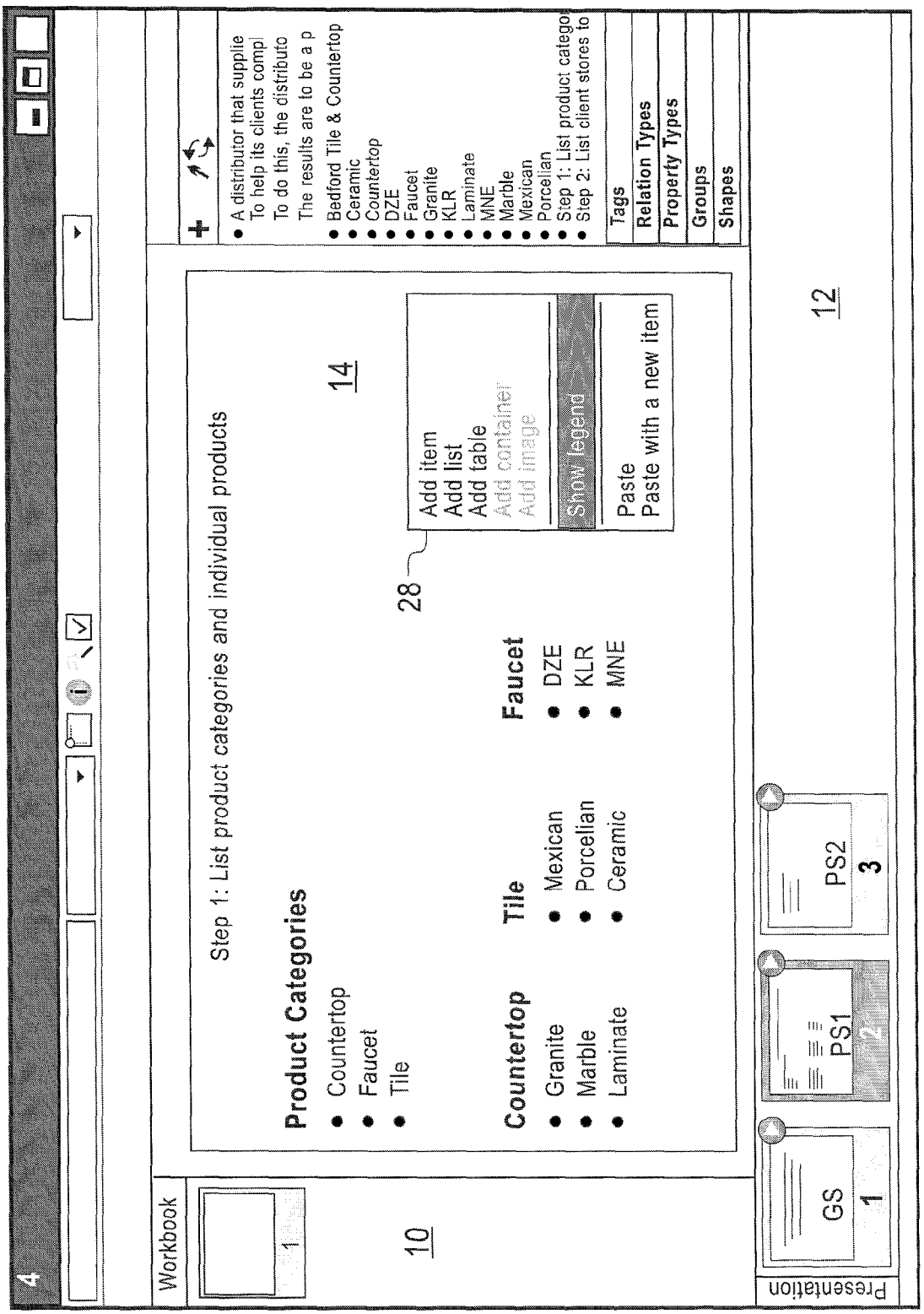
FIG. 4 illustrates an effect of right-clicking on a sheet to display a context menu, which is used to create a Legend.
Figure 5:
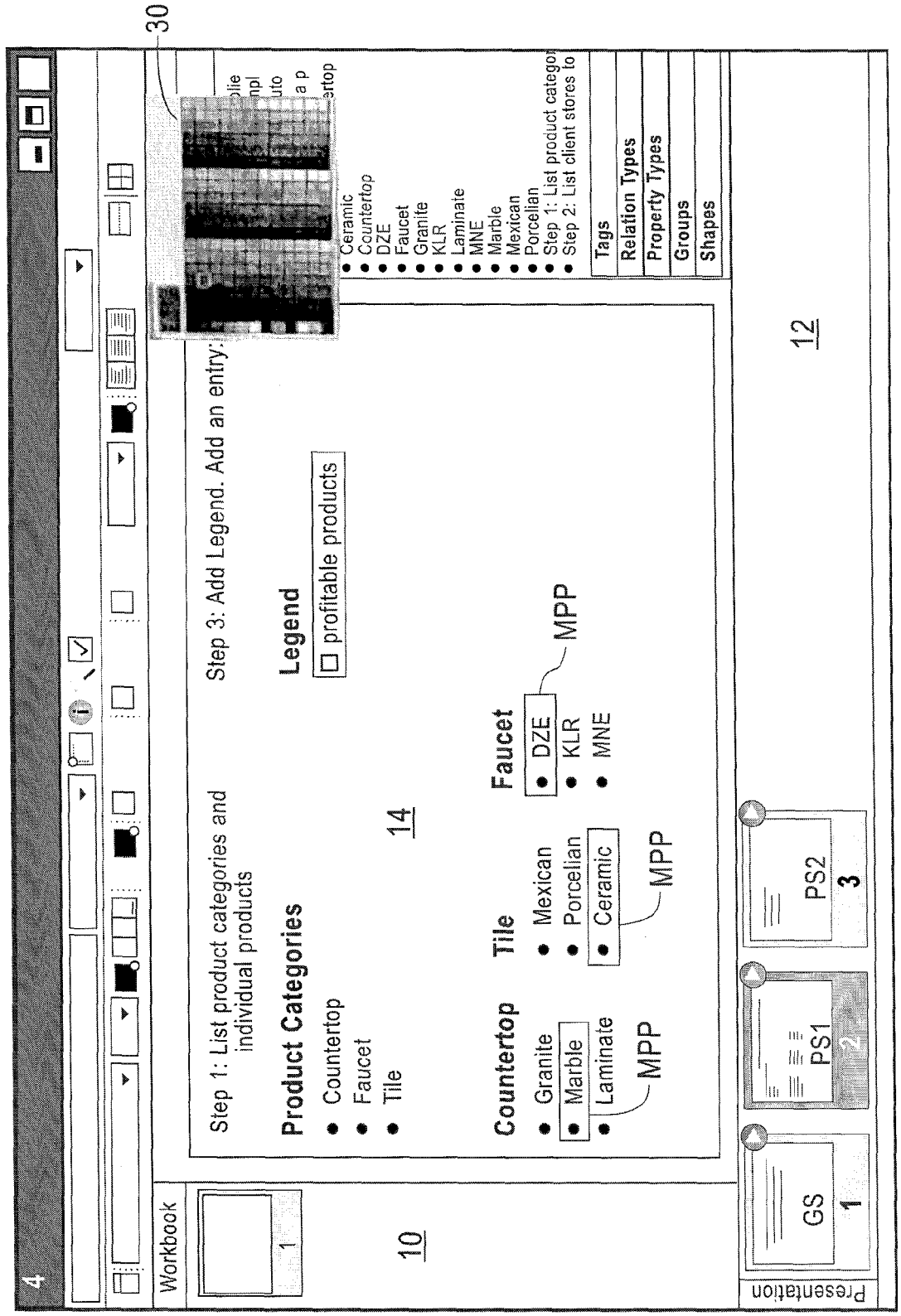
FIG. 5 illustrates, after adding a Legend, the user selecting a color to mark most profitable products.

FIG. 4 shows an effect of right-clicking on the sheet to display a context menu 28, which the presenter uses to create a Legend. In FIG. 5, after adding the Legend the user selects from a palette 30 a color to mark the most profitable products (MPPs). The results of the operations on PS1 in the composition/editing area 14 are reflected in the image of PS1 located in the Presentation area 12.

Assume that the user now wants to mark the most profitable products on PS1 where all of the products are listed. The user returns to PS1 of the presentation and creates a Legend by selecting "Show Legend" (see FIG. 4). The user then adds an entry titled "profitable products" to the Legend and assigns it a green "border" property. Using a drag-and-drop gesture the user drags the entry to the Countertop list and drops it on the "Marble". In a similar manner the user frames the "Ceramic" tile and "DZE" faucet as the most profitable in each relevant category.

Figure 6A:
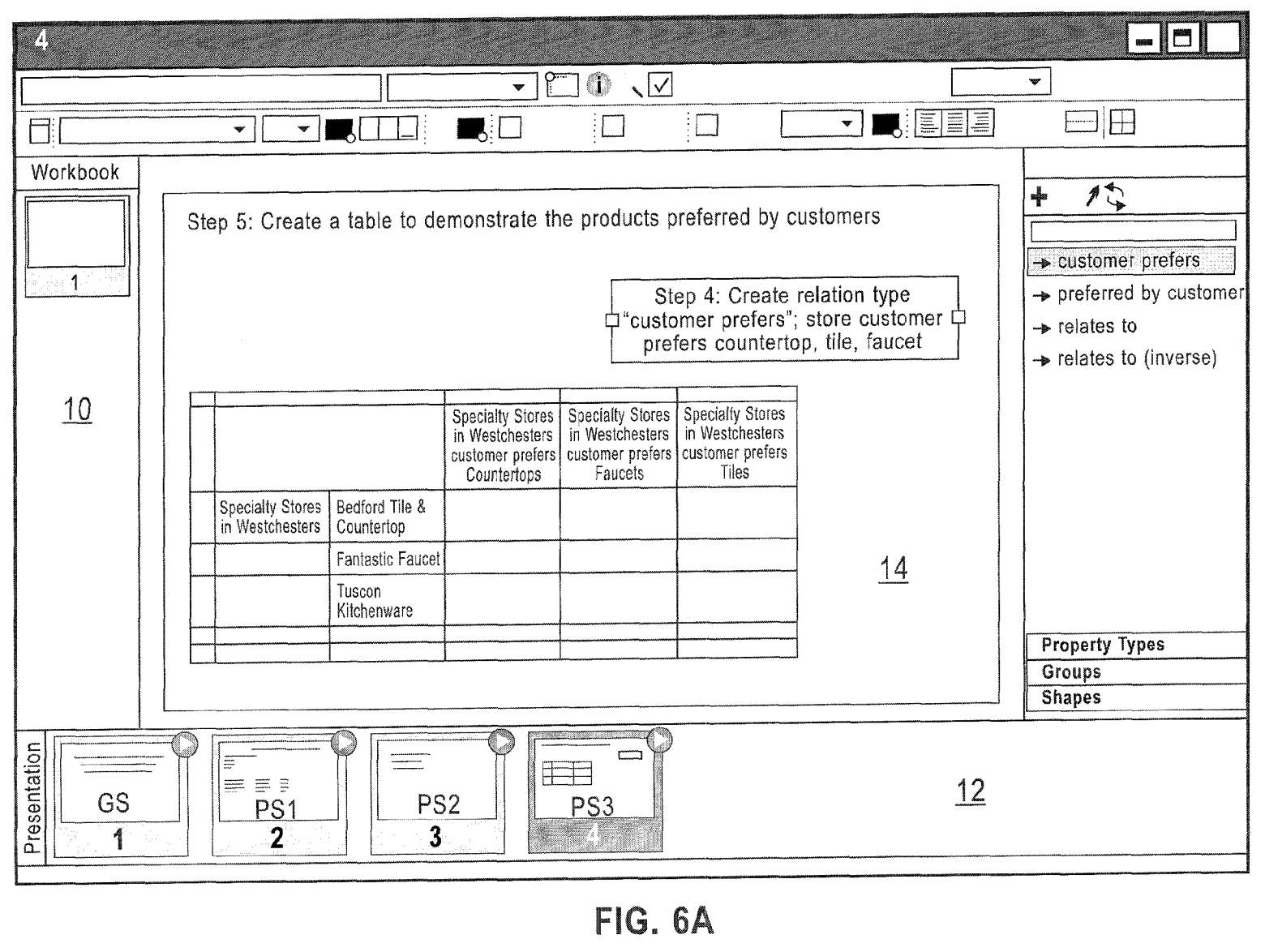

After selecting the most-profitable items the user creates a relation type called "customer prefers" using a dialog brought up from the Relation Types 18 view (one of the views visible to the right in FIG. 6A.). The user creates a table on the next sheet of the presentation (PS3). The table will be filled out later with data collected from the customer survey. The headers of the vertical dimension are names of the stores; the headers of the horizontal dimension are relations: "customer prefers countertop", "customer prefers faucet", and "customer prefers tiles."

Figure 6B:
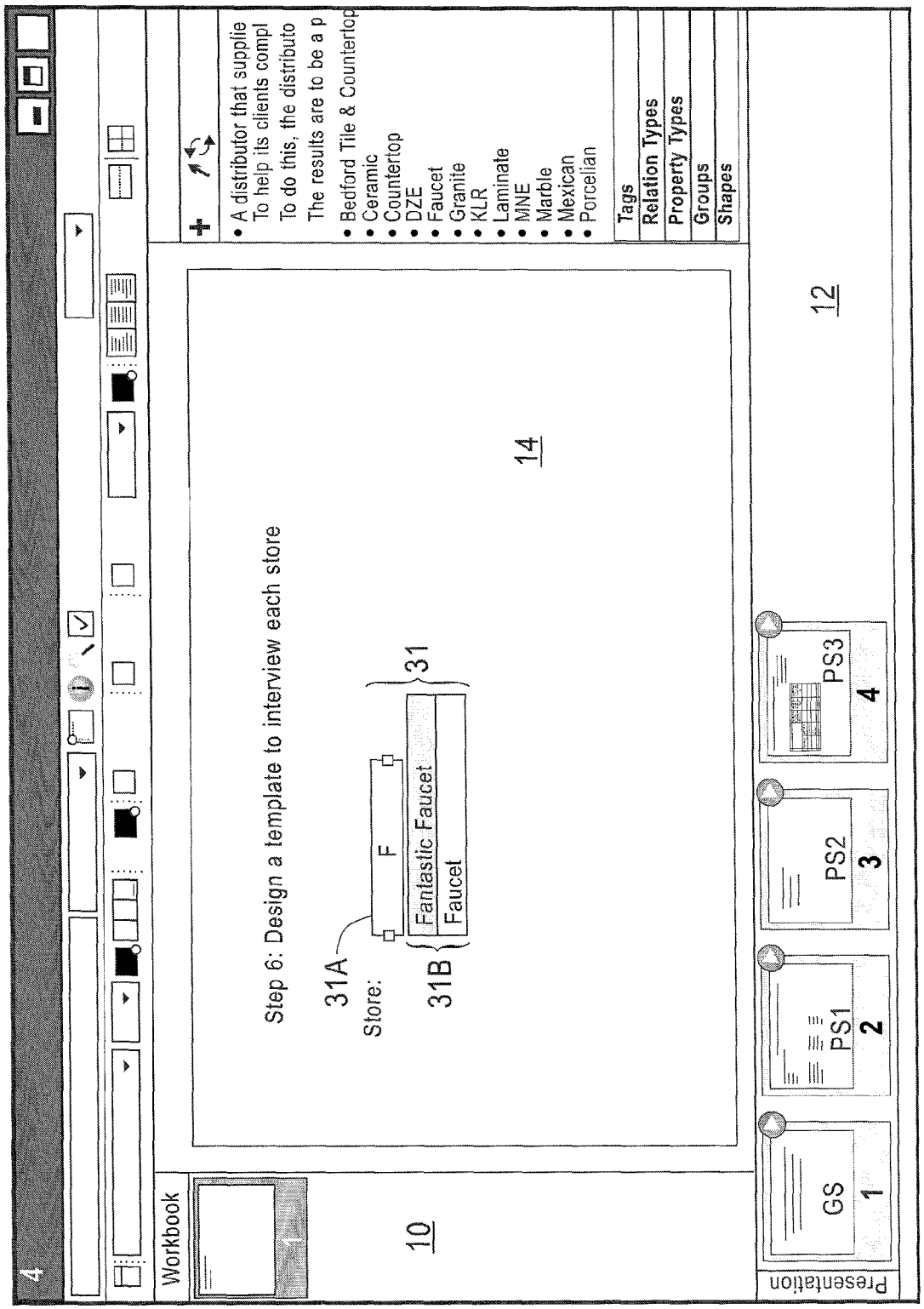
FIG. 6B shows the use of an auto-completion selector that is an exemplary aspect of this invention.

FIG. 6B shows the use of an auto-completion selector 31 that is an exemplary aspect of this invention. The auto-completion selector 31 is associated with an element such as, but not limited to, a text box element, and enables the user to select, via the user interface 201A, 201B (FIG. 18) of the presentation application that creates the presentation, at least one existing item from the underlying model (e.g., a Content model 46 shown in FIGS. 11 and 15) for adding to a sheet being composed by the user. In the example of FIG. 6B the user has typed a 'F' into the text box 31A, and there is then displayed to the user at 31B two items from the Content model 46 that start with the letter 'F' (i.e., 'Faucet' and 'Fantastic Faucet'). By (optionally) selecting one of the displayed items the resulting text is automatically inserted into the text box 31A. The use of this (optional) feature facilitates the entry of text and other information while reducing user input errors.

Figure 7:
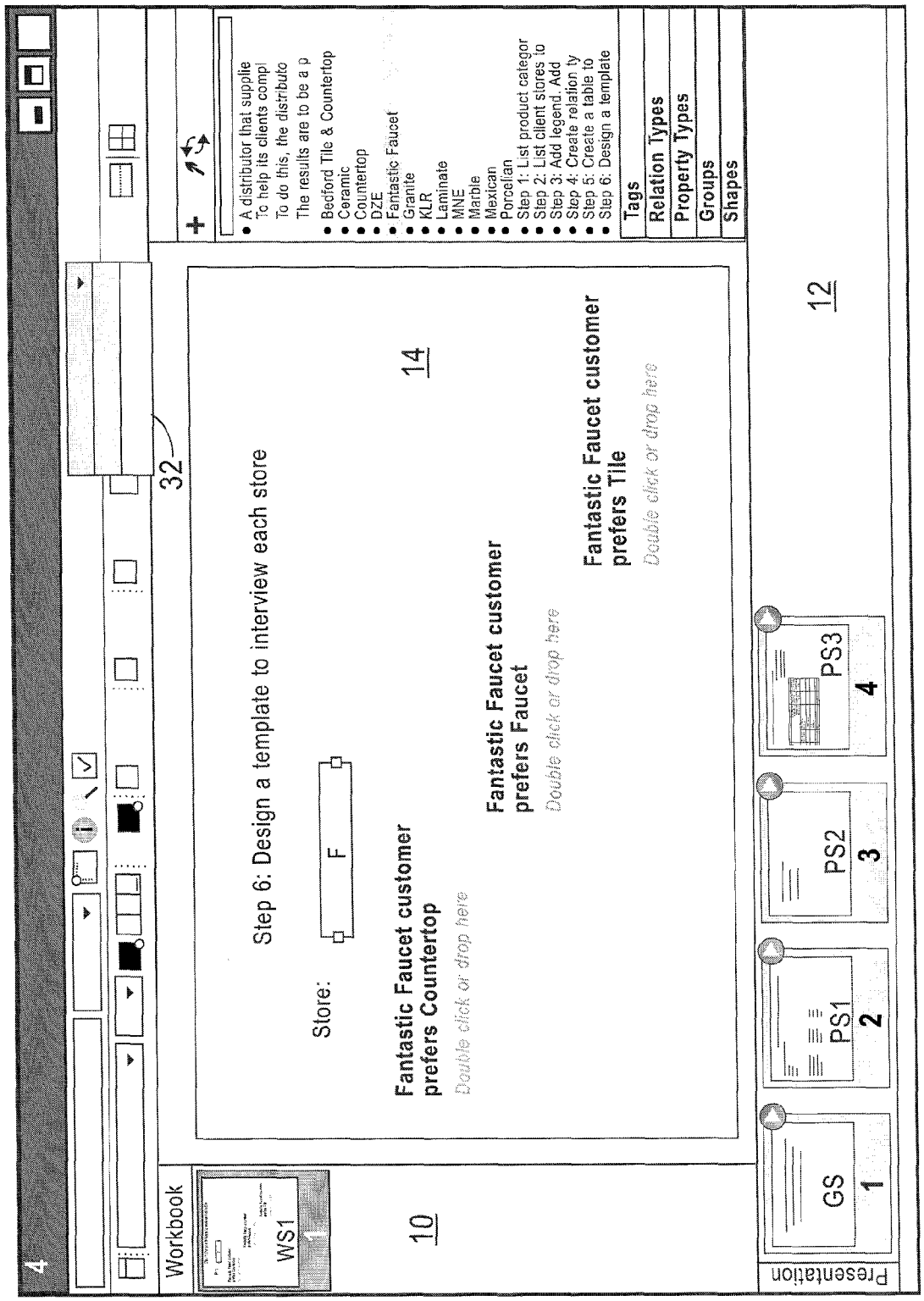
FIG. 7 shows the creation of a distinctive "Form" worksheet.

For example, as in FIG. 7 and in order to perform a customer survey, the user first adds a new blank sheet (WS1) to the "work-book" area 10 to design a survey form. The user designs the form for the store "Fantastic Faucet" by first creating a text box 31A and typing the name of the store inside it. As soon as the user types in the first letter of the store's name, 'F', all items stored in the model 45 with names starting with the letter 'F' appear in the prompt 31B (completion selector) attached, for example, to the bottom of the text box 31A. The user selects "Fantastic Faucet". The user then adds lists, which will be filled in during the customer survey. The list names are: "Fantastic Faucet customer prefers Countertop", "Fantastic Faucet customer prefers Faucet", and "Fantastic Faucet customer prefers Tile".

Figure 8:
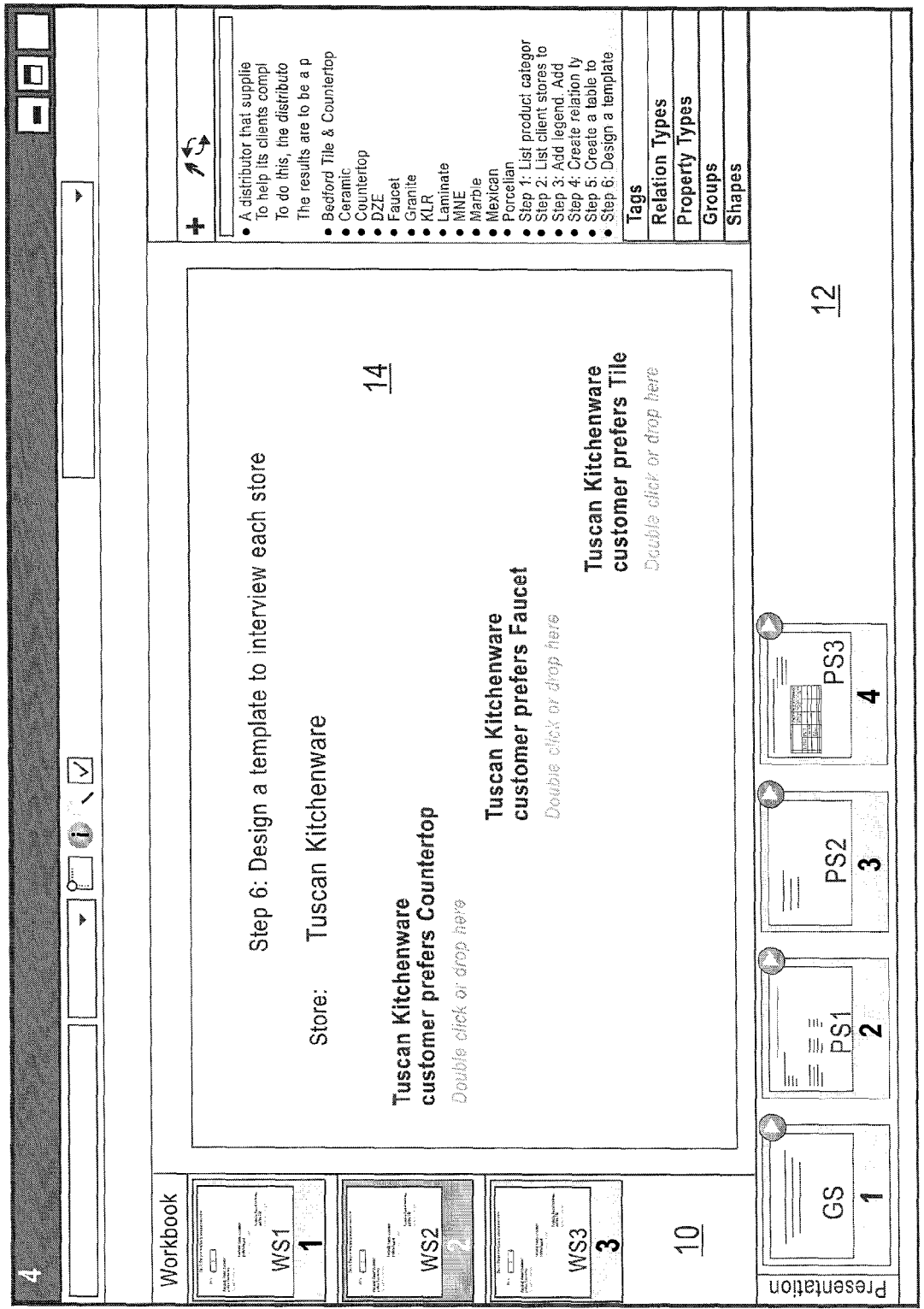
FIG. 8 illustrates the automatic template-based creation of additional "Forms" in the worksheet area.

This distinctive worksheet WS1 is used to create a template and to instantiate "forms" for all listed stores within the list "Specialty Stores in Westchester" (see the list the user created in FIG. 3, which corresponds to PS2). The user next instantiates the creation of forms for the other stores by selecting "Bedford Tile & Countertop" and then selecting the option "Specialty Stores in Westchester" from a pull-down menu 32. As a result of this action, two additional worksheets (WS2, WS3) are automatically added to the "work-book" area 10, as shown in FIG. 8.

Figure 9:
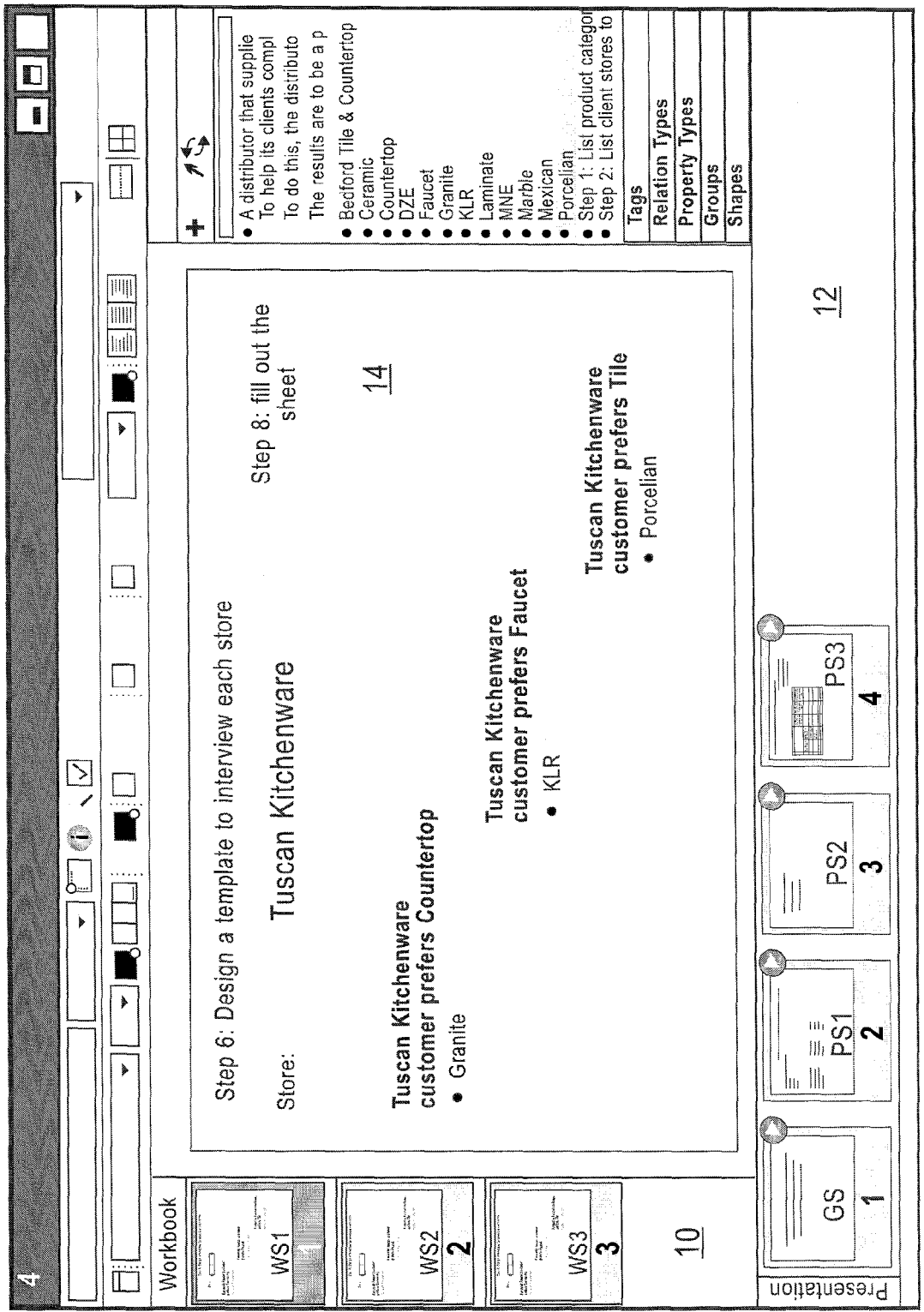
FIG. 9 shows one of the forms filled in with information by the user.

After interviewing the storeowners the user fills out the fields in all three forms with customer-preferred products. One such filled out form is shown in FIG. 9.

It should be noted that while the user is filling in the forms of WS1, WS2 and WS3 the cells in the presentation table shown in FIG. 6A (PS2) are automatically populated with this "customer prefers" information. This ability to automatically provide consistency amongst various forms and presentation sheets is an aspect of the exemplary embodiments of this invention.

Figure 10:
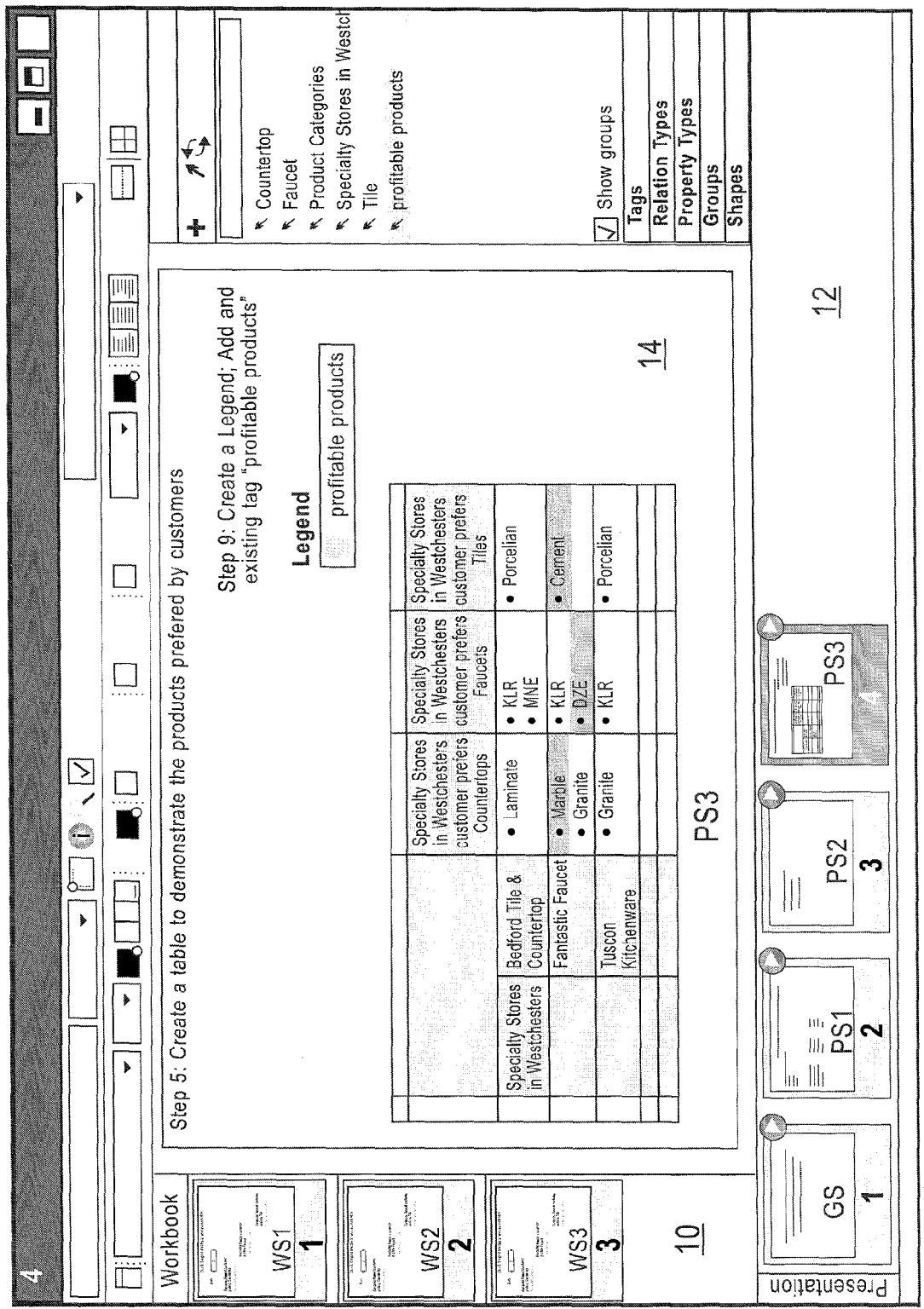
FIG. 10 illustrates the table of FIG. 6A filled in with customers' preferred products and "profitable" products highlighted with a fill color.

In FIG. 10 the user clicks on PS2, thereby bringing up to the composition/editing area 14 and adds a Legend to it to highlight the "profitable products". In this exemplary embodiment the profitable products are indicated with a fill color added within each associated cell of the table.

By examining the table of FIG. 10 one can readily determine that in only one store, Fantastic Faucet, do customer tastes coincide with the most profitable products. The other two stores have among their top-sellers less profitable products.

Having thus provided a relatively simple and non-limiting example of the generation of presentation sheets for one particular use case, reference is made to FIGS. 11-17 for a description of the underlying logic and mechanisms used at the model level by the exemplary embodiments of the presentation application of this invention.

Figure 11A:
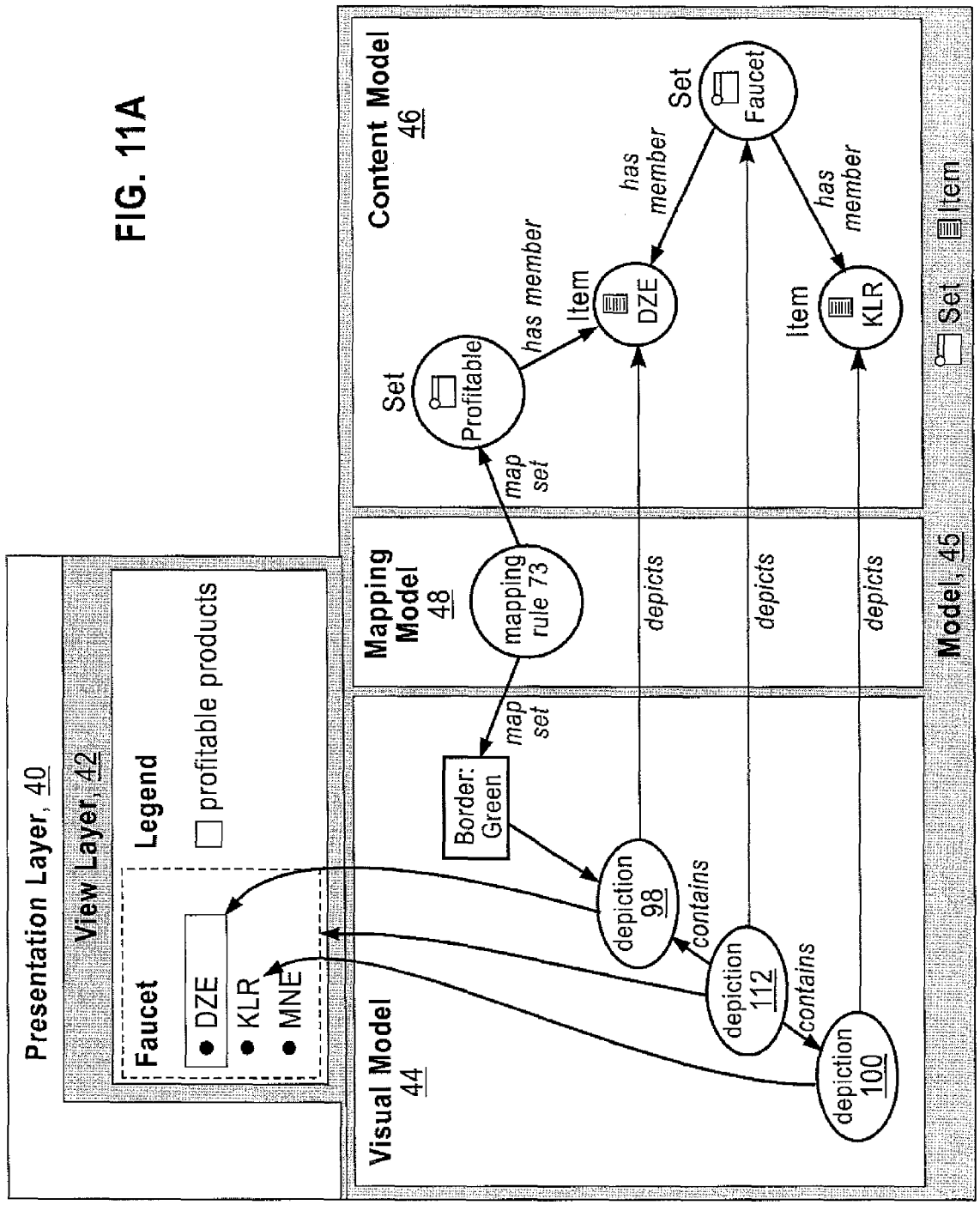
FIGS. 11A and 11B, collectively referred to as FIG. 11, illustrate various models and the interactions between them while the user was creating the presentation as in FIGS. 1-10.

Referring first to FIG. 11A there are shown various logical constructs including a Presentation layer 40 which includes a View layer 42, and a Model 45 that comprises a Visual model 44, a Content model 46 and a Mapping model 48 interposed between the Visual model 44 and the Content model 46. As the user manipulates elements of the visual layer (View Layer 42) of the application, that is, as the user creates lists, tables, the template and the forms, the model 45 is operating to create different sets and set members, relationships, group of relationships, parameters, and to build the organization structure with the recorded data.

In a conventional presentation application the list of products in the Faucet list (FIG. 2, i.e., DZE, KLR and MNE) would be simply a list of products (character strings) with no underlying meaning. However, in accordance with the exemplary embodiments the Content model 46 is responsible for creating, based on input character strings typed in by the user, a set "Faucet" and members of this set as: "DZE", "KLR", and "MNE". When the user creates the Legend (FIG. 5) and adds a "profitable products" entry to it in order to mark the profitable products in the product lists, a new set "profitable products" is automatically created, as well as a mapping rule 73 associated with the set "profitable products". Note in this example that the product element DZE is a member of the set "Faucet" and is also a member of the set "profitable products". When the user chooses the green border to mark the profitable products, a style attribute called "border" having a value "green" are added as a pair to the mapping rule 73. The use of such mapping rules beneficially provides consistent visual cues in the View Layer 42 due to the consistency provided by the Content model 46.

Note that the Faucet "DZE" in FIG. 2 and "DZE" in the cell of the table in FIG. 10 is the same element as in the Content model 46, though it is presented in two different depictions in the View Layer 42. Thus, changing the name of this element in the list of FIG. 2 would immediately be reflected by a change of the name in the cell of the table of FIG. 10, as well as in all other occurrences of the name.

When the user creates the relation type called "customer prefers", indicating the "source" as "Westchester Specialty stores" and the "targets" as: "Countertop", "Faucet" and "Tiles", relation groups (sets) are created by the Content model 46 between the source category, "Westchester Specialty stores", and each of the target categories (Countertop, Faucet, and Tile). Consequently, in each of the groups a sub-set for each member of the set of "Westchester Specialty stores" (Bedford Tile & Countertop, Fantastic Faucets, and Tuscan Kitchenware) is also formed to later accept preferable products as "target" members.

FIG. 11A also shows, inside the visual model 44, the concept of a "list view" 112 that contains a first depiction 98, which depicts, via the Content model 46, DZE, which is a member of the set "Faucet". The "list view" also contains a second depiction 100, KLR, which is also a member of the set "Faucet". A third depiction containing MNE is also present. The "list view" 112 depicts, via the Content model 46, the set Faucet. The green border of the depiction 98 is depicted via the Mapping model 48 using a style attribute named "border".

As should be appreciated, the use of the exemplary embodiments of this invention provides consistency between sheets at least in part through a mapping of the syntax of visual elements onto items in an underlying semantic model. In other words, the View layer 42/Visual model 44 respond immediately to the user's action by changing the affected depictions. After that, the Model 45 computes the effects on the Content model 46 and depictions and then notifies the View layer of depiction changes. Alternatively, the View layer can pass the actions to the Model 45 and the Model 45 can then determine what further changes are needed to ensure consistency, make them, and notify the View layer 42 accordingly.

Figure 11B:
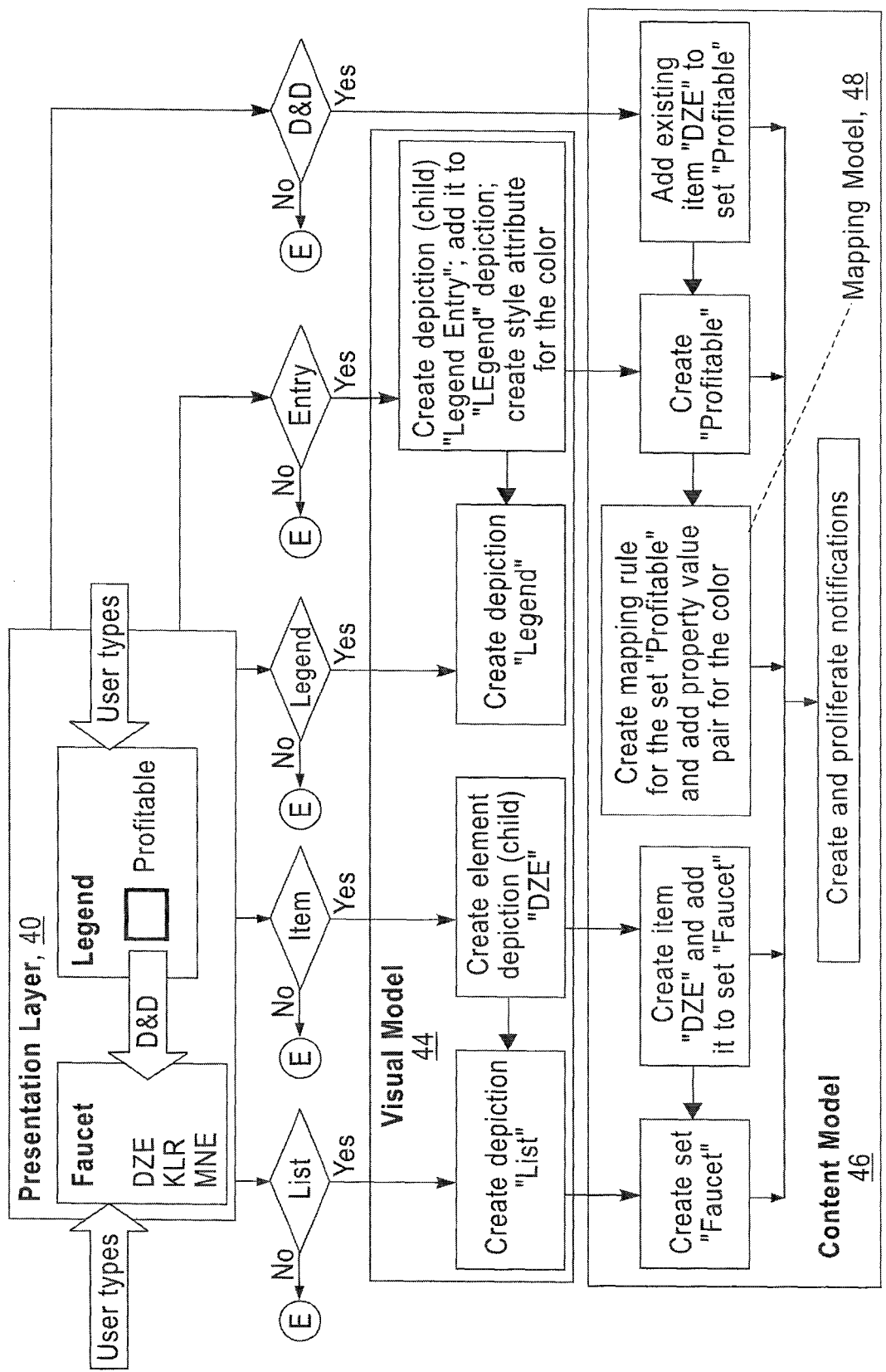

This is made apparent as well in FIG. 11B. Note for example that as the user types in the presentation layer 40 the underlying Visual model 44 is creating the depiction "List" and the underlying Content model 46 is creating the set "Faucet". In addition the Visual model 44 is creating the element depiction (child) "DZE" of the "List", while the Content model 46 is creating the item "DZE" and adding it as a member of the set "Faucet". The process continues for creating the Legend, the Legend entry, the set "Profitable" and adding "DZE" as a member of the set "Profitable". The mapping rules are also created by the Mapping model 48 as explained above with reference to FIG. 11A.

Figure 12:
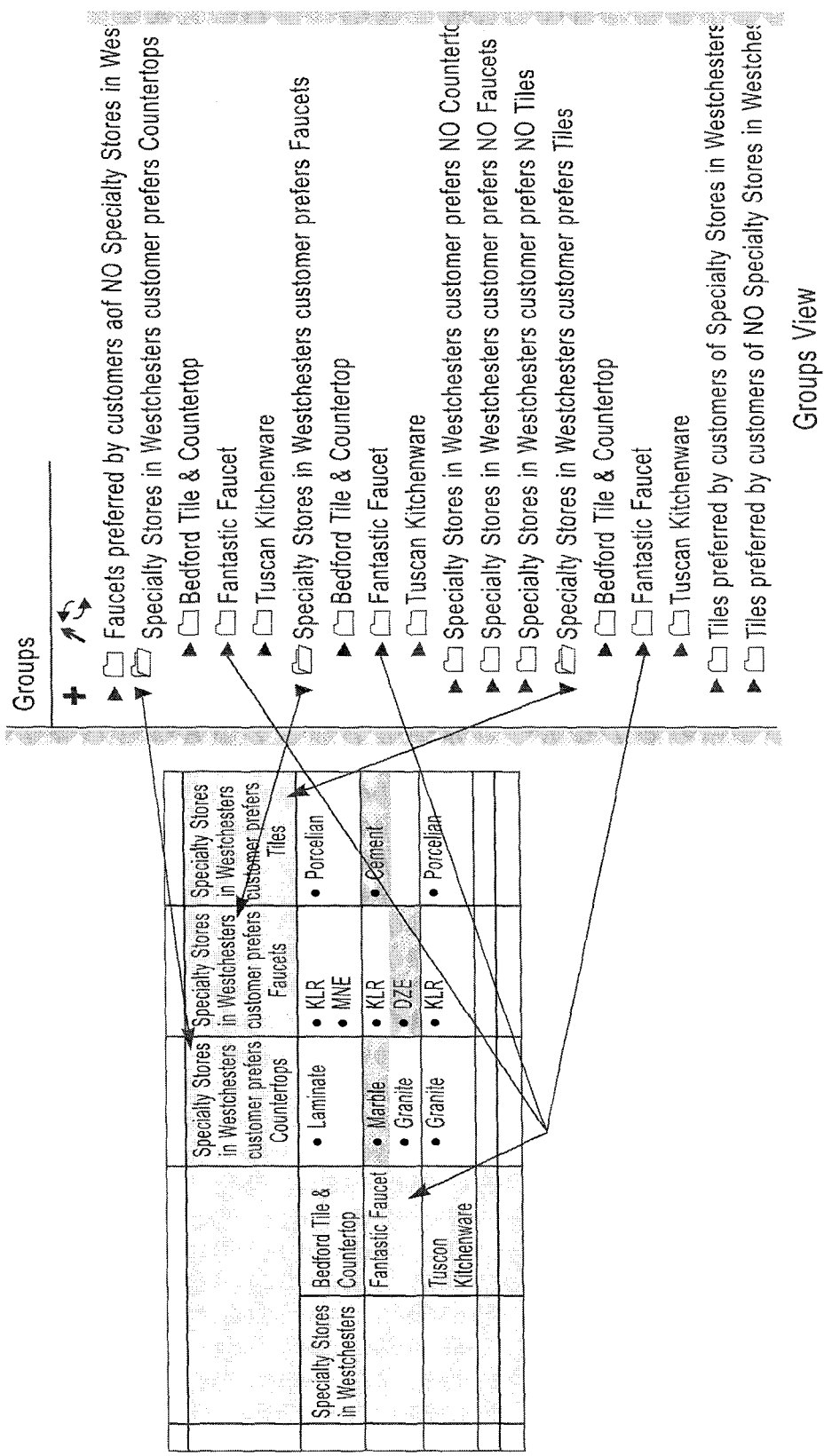
FIG. 12 shows a Group View (to the right of the table) used to create the distinctive worksheet presented in FIG. 7.

FIG. 12 illustrates the procedure to create a distinctive worksheet (e.g., WS1), where the user drags and drops (D&D) a sub-set (<store> customer prefers <product>) from the Groups view to the worksheet (FIG. 7). The table is then automatically filled in by the Content model 46 with the product names after the completion of the customer survey.

Figure 13:
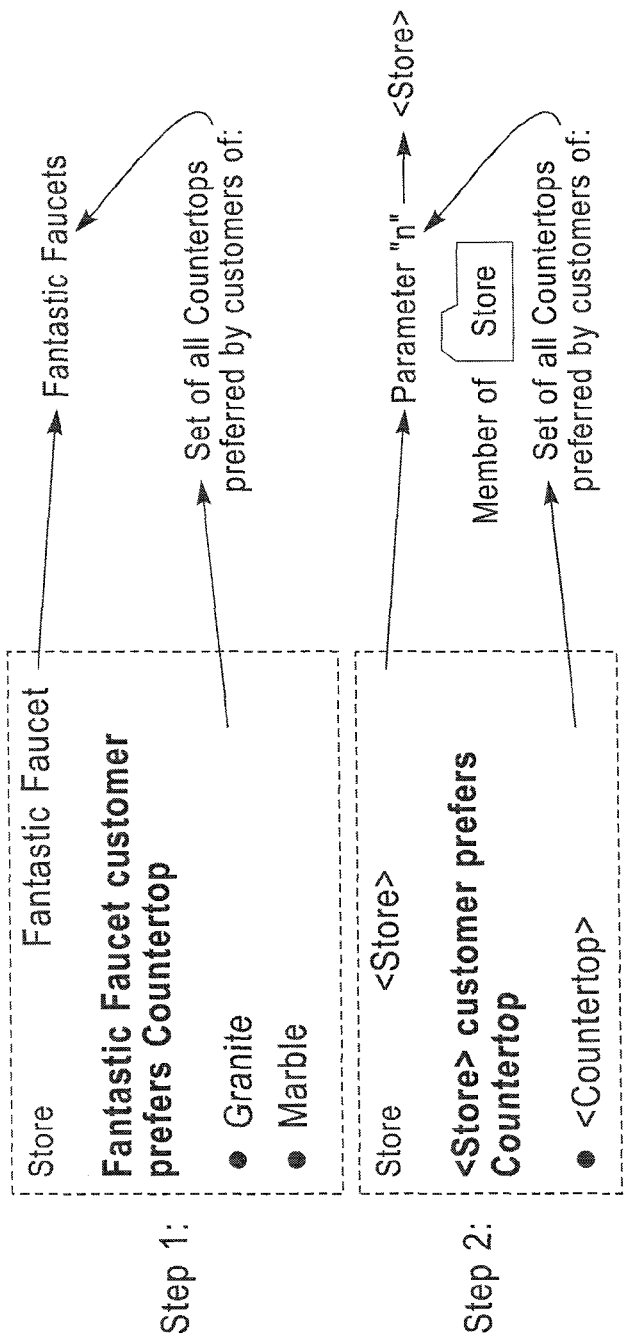
FIG. 13 depicts a two-step process of an operation at the model level while the user was creating a template from a distinctive worksheet.
Figure 14:
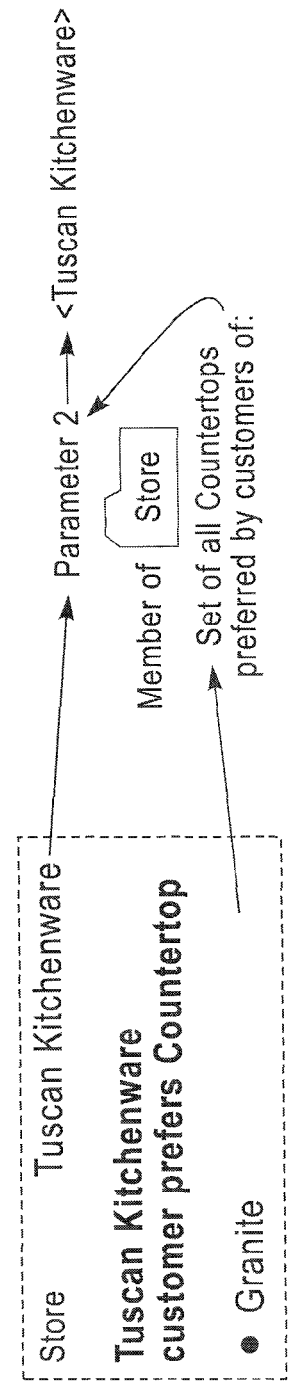
FIG. 14 depicts an operation at the model level while the user was creating a form from a template.

Referring to FIG. 13, to create a template from this distinctive worksheet the user selects the store "Fantastic Faucet" on the worksheet itself and then selects the set "Westchester Specialty Stores" option from the pull-down menu (Step 1). When the set "Westchester Specialty Stores" option is selected, the template with the parameter <store> (Step 2) is created. The user does not see this template as it is part of the underlying model. What the user does see in the View Layer 42 are "forms" being created within the new worksheets WS2, WS3 which are automatically generated for each store. In the model 45 each store element becomes a "parameter" for the "parameterization", that is the automatic creation of an individual work sheet (form), of each store in the set "Westchester Specialty Stores". Reference can also be made to FIG. 14.

FIG. 13 depicts a two-step process of an operation at the model level while the user was creating a template from a distinctive worksheet. In operation each store element becomes a "parameter" for the "parameterization", i.e., for the automatic creation of an individual sheet for each store in the "Westchester Specialty Stores" set (see FIG. 14).

FIG. 14 depicts an operation at the model-level while the user was creating a form from a template (in this case for Fantastic Faucet).

Figure 15:
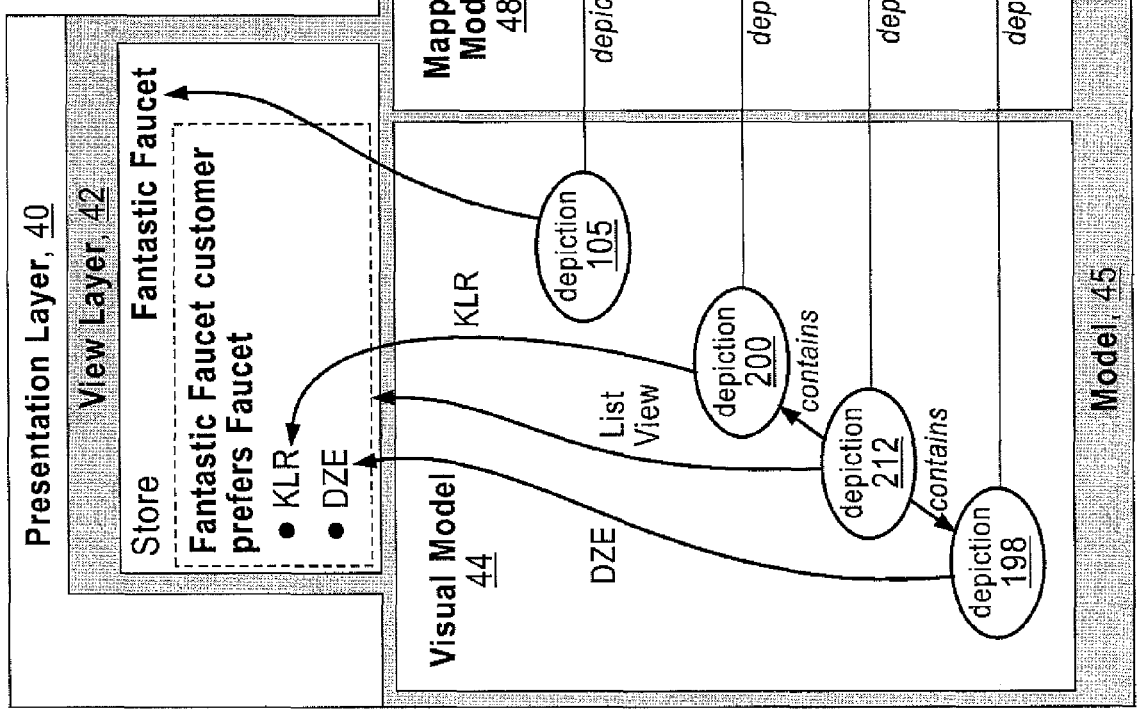
FIG. 15 provides a more general overview of the creation of a template from a distinctive worksheet.

FIG. 15 provides a more general overview of the creation of a template from a distinctive worksheet. In this case there is a depiction 105 of the store name "Fantastic Faucets". Note that the depiction 105 depicts, via the Content model 46, a parameter 05 that has the item value "Fantastic Faucets", which is a member of the set "Store". Parameter 05 has a constraint set relationship with the set "Store". The "list view" 212 in this example contains the first depiction 200 that depicts, via the Content model 46, KLR, which is a member of the set "Faucet". The "list view" also contains the second depiction 198, DZE, which is also a member of the set "Faucet". The "list view" 212 depicts, the sub-set "<Fantastic Faucets>-customer prefers-Faucet", which targets KLR and DZE, and which has as a source item the template parameter 05 having the value "Fantastic Faucets".

Figure 16:
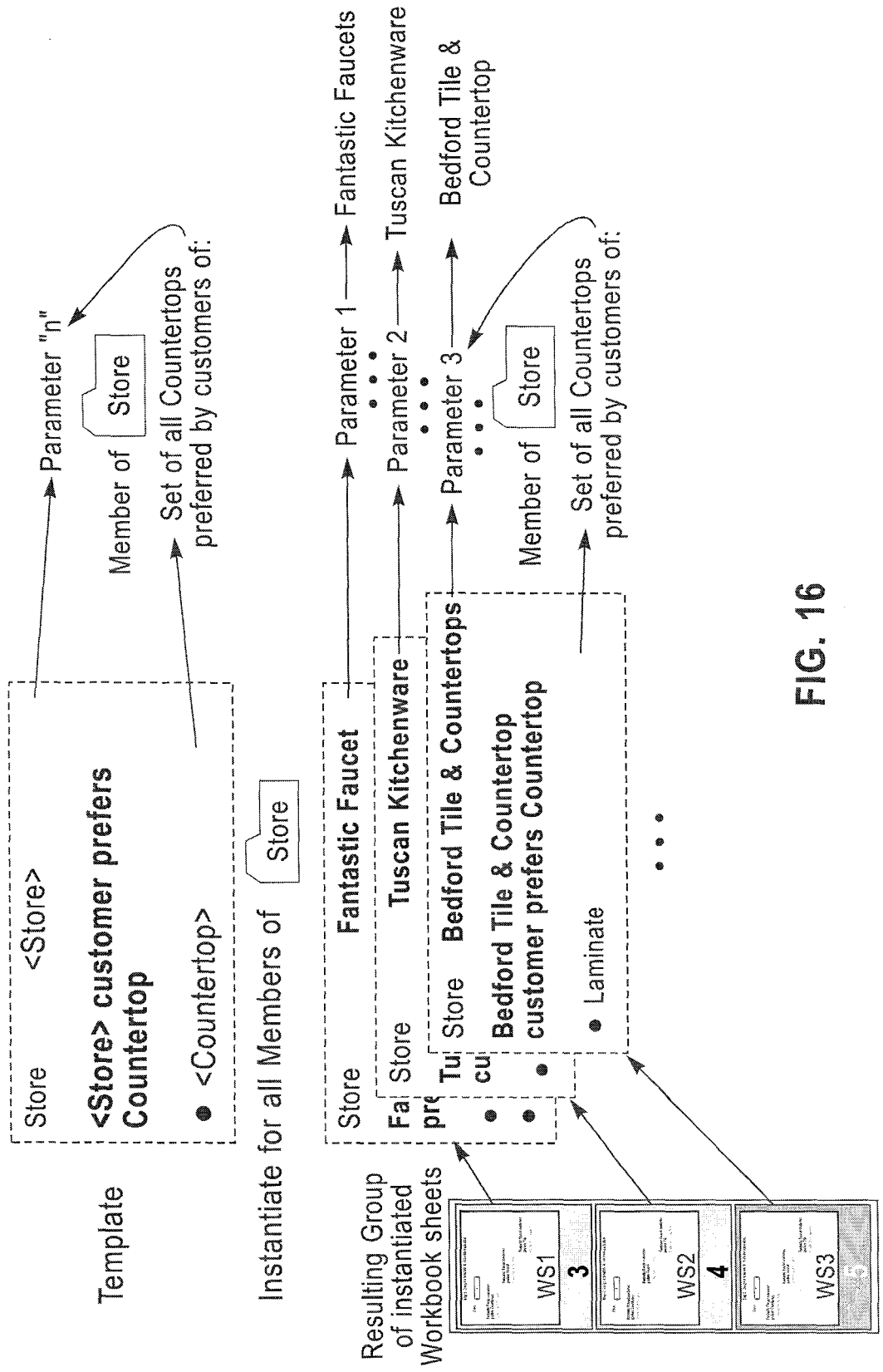
FIG. 16 illustrates instantiation over a set in the context of the automatic creation of a set of workbook sheets.

FIG. 16 is related to FIGS. 12-15 and shows the concept of instantiation over a set. The template is created and is instantiated to all members of the set "Store". The resulting group of instantiated work-book sheets (WS1-WS3) have associated parameters that are the names of the stores which are members of the set "Store". A new sheet is created automatically for each item in the set "Store", and the associated value of "<store> customer prefers-countertop" is filled in automatically.

Figure 17:
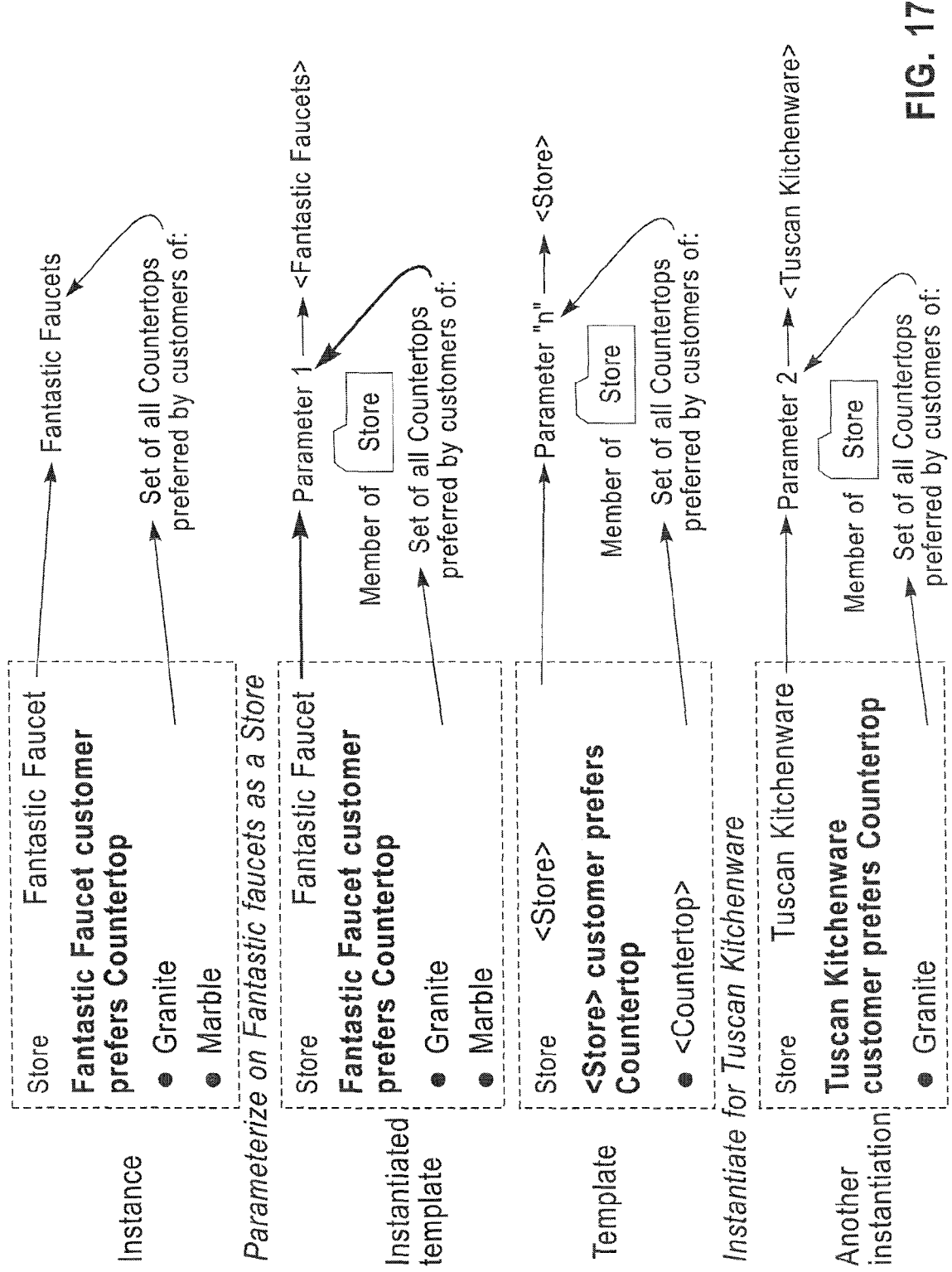
FIG. 17 illustrates related processes of template creation and instantiation.

FIG. 17 illustrates related processes of template creation and instantiation. Starting with the instance of "Fantastic Faucets customer prefers countertop" and parameterizing on Fantastic Faucets as a member of the set "Store", there is generated an instantiated template, the template, and then another instantiation of the template for Tuscan Kitchenware (another member of the set "Store").

Figure 18:
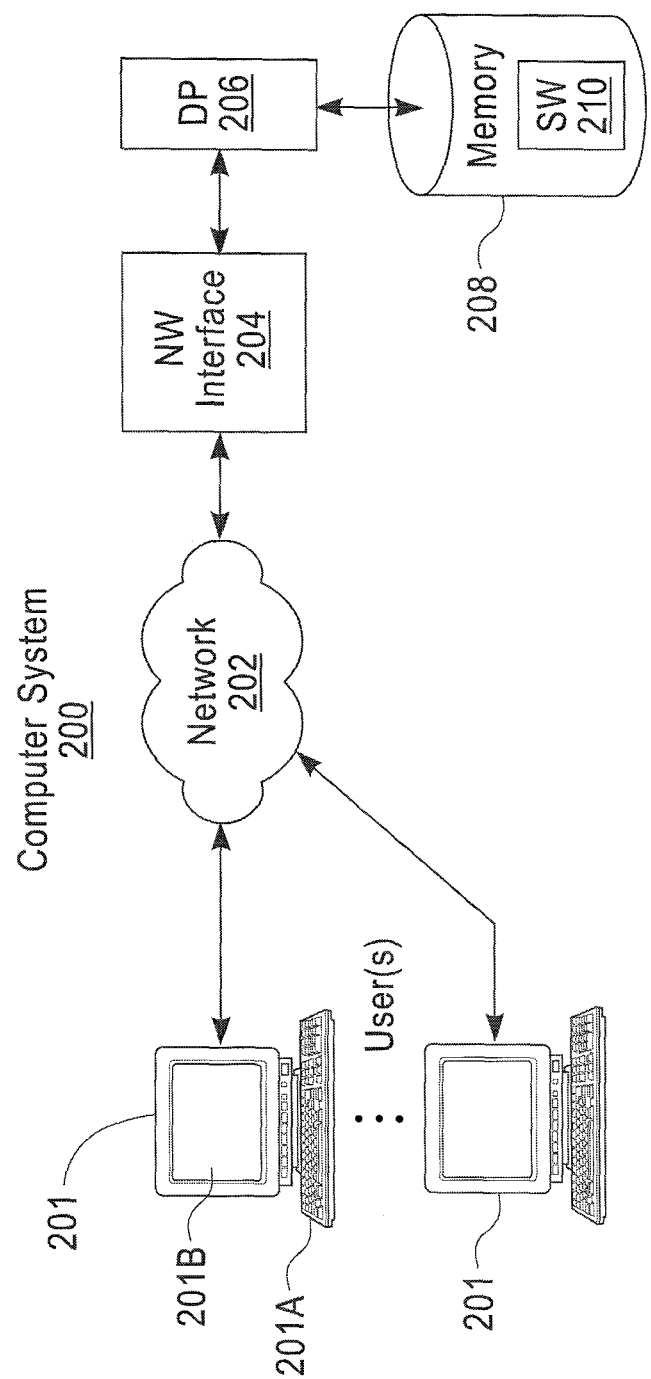
FIG. 18 presents a simplified view of a computer system that is one suitable embodiment of a system for implementing the exemplary embodiments of this invention.

FIG. 18 presents a simplified view of at least a portion of a non-limiting embodiment of a computer system 200 that can be used to implement the exemplary embodiments described above. The computer system 200 can take a number of different forms, including a desktop PC, a workstation or a mainframe. The computer system 200 can also be realized as a portable computing device embodied as a laptop or a notebook computer, a tablet-based computer or a portable device having other types of functionality, such as a smartphone. In the illustrated embodiment some number of users (at least one), each associated with a terminal 201, can be connected to the system 200 via a network 202 (e.g., a local area network (LAN) or a wide area network (WAN)) and one or more suitable network (NW) interfaces 204. The user terminals 201 can be assumed to include some type of user data entry device 201A such as a keyboard and/or a pointing device and/or a touch-sensitive surface. The user terminals 201 can also be assumed to include some type of visual display (e.g., a graphical user interface) for embodying the presentation layer 40 and view layer 42 (FIG. 11A).

The computer system 200 includes at least one data processor (DP) 206 connected with at least one computer-readable medium (memory 208) that stores computer program code or software (SW) 210 containing a program or programs of machine-executable instructions. At least some of the stored instructions, when executed by the associated data processor(s) 206, result in the implementation of the Presentation application and the performance of methods in accordance with the exemplary embodiments of this invention, such as those made evident in the foregoing FIGS. 1-17 and described below with respect to FIG. 19. As such, at least some of the stored instructions, when executed by the associated data processor(s) 206, result in the implementation of the Presentation layer 40 that includes the View layer 42, as well as the Model 45 that comprises the Visual model 44, the Content model 46 and the Mapping model 48 interposed between the Visual model 44 and the Content model 46. As the user manipulates elements of the visual layer via the terminal data entry and data visualization components 201A and 201B to create lists, tables, templates and forms, as described above, the Model 45 is operating to create different sets and set members, relationships, group of relationships, parameters, and to build the organization structure with the recorded data. In this manner the user is enabled to interact with the extended and enhanced Presentation application that provides consistency and coherency across multiple presentation-book and work-book sheets. Execution of the stored computer program instructions by the at least one data processor 206 provides the consistency at least in part through the mapping of the syntax of visual elements onto items in the underlying semantic model.

In some embodiments all of the functionality described above may be resident in a single user terminal 201.

Figure 19:
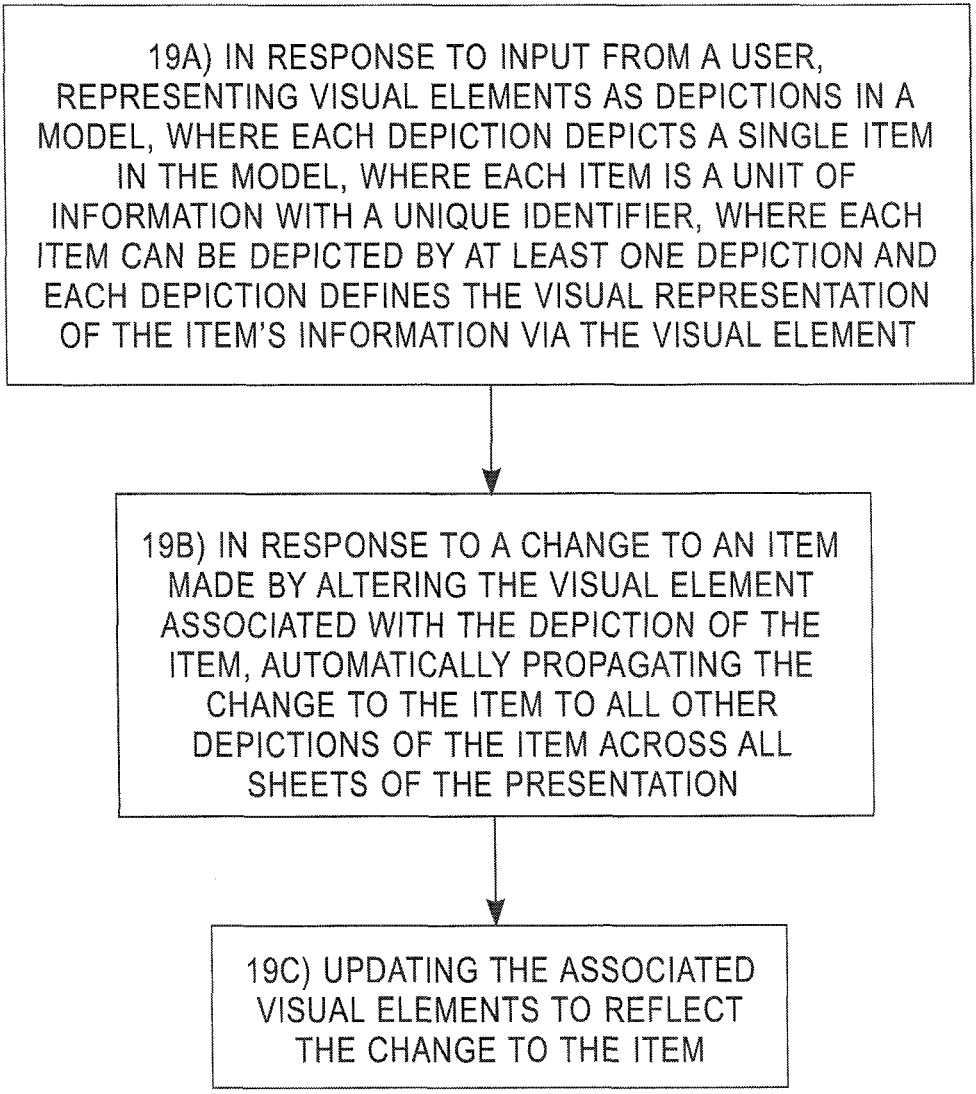
FIG. 19 presents a logic flow diagram that is illustrative of a non-limiting embodiment of a method in accordance with this invention.

FIG. 19 presents a logic flow diagram that is illustrative of a non-limiting embodiment of a method that is a feature of this invention, i.e., a computer-implemented method to create a presentation comprised of at least one sheet, where each sheet contains one or more visual elements.

The method comprises (Block 19A) a step performed, in response to input from a user, of representing visual elements as depictions in a model, where each depiction depicts a single item in the model, where each item is a unit of information with a unique identifier, where each item can be depicted by at least one depiction and each depiction defines the visual representation of the item's information via the visual element. The method further comprises (Block 19B) a step performed, in response to a change to an item made by altering the visual element associated with the depiction of the item, of automatically propagating the change to the item to all other depictions of the item across all sheets of the presentation. The method also comprises (Block 19C) a step of updating the associated visual elements to reflect the change to the item.

In the method as in FIG. 19, an item can be a member of at least one set in the model.

In the method as in FIG. 19, an item can comprise a single item, a set of items, or a set of sets.

In the method as in FIG. 19, where a depiction can comprise one of a text box, a list, a table, a diagram, or a chart.

In the method as in FIG. 19 further comprising, for a sheet containing a depiction of a particular item, transforming the sheet into a template based on a set membership of the particular item, where the template can be applied to any other member of the set of which the particular item is a member.

In the method as in the preceding paragraph, and further comprising a step of using the template to automatically generate a sheet for each member of the set.

In the method as in FIG. 19, where a user interface of a presentation application that creates the presentation provides two dedicated separate visual display areas for sheets, one visual display area being for work-book sheets and another visual display area being for presentation-book sheets.

In the method as in the preceding paragraph, where an item can be a member of at least one set in the model, and where for a sheet, in either a presentation or in a work-book, containing a depiction, transforming the sheet into a template based on a set membership of the item associated with the depiction, and using the template to automatically generate a sheet for each member of the set, either in a presentation or in a work-book.

In the method as in FIG. 19, where an auto-completion selector is associated with an element enabling a user to select, via a user interface of a presentation application that creates the presentation, at least one existing item from the model for adding to a sheet being composed by the user.

In the method as in FIG. 19, where the model is comprised of a visual model that operates with a view layer, a content model, and a mapping model that provides mapping rules between contents of the visual model and the content model.

It should be noted that while the model 45 has been described above as being comprised of the visual model 44 that operates with the view layer 42, the content model 46, and the mapping model 48 that provides mapping rules between contents of the visual model 44 and the content model 46, this is but one exemplary and non-limiting embodiment of the model 45. In other embodiments the model 45 may have more or fewer than the three components or partitions represented by the visual model 44, the content model 46 and the mapping model 48. For example, in some embodiments the model 45 may be implemented as a cohesive, homogeneous and unitary model without any discernible underlying functional partitions.

The exemplary embodiments provide an interactive system that enables styling of visual elements, where the visual elements and their styles are recorded in a semantic model as the user creates a presentation, and where consistency is provided by the mapping between the syntax of the visual elements and items in the underlying semantic model. The exemplary embodiments further provide a content-oriented 'template' design presentation application.

While the exemplary embodiments have been described above in the non-limiting context of stores that sell certain products, etc., this is clearly but one non-limiting example of the utility of the invention. For example, consider another exemplary use case where a user desires to prepare an organization chart deck. In this example assume there are two types of people, employees and managers, where a manager manages employees. If one were to create a template using conventional means then the user would need to create a visual placeholder on a slide where the manager's name would appear, and another placeholder where the list of employees (for that manager) would appear.

However, this conventional visual template contains no knowledge about what a manager is and that a manager has a group of employees. Therefore to automate creation of the deck of slides with organization information a macro or some similar type of programming tool would need to be written; where the macro would have to be provided with explicit domain knowledge of what to display in the visual placeholders.

In contradistinction to the conventional approaches, by the use of the exemplary embodiments of this invention the user could instead create a template that not only saves the visual layout, but also "captures" the content oriented layout. In this example a manager entity would be displayed in a text box on the sheet or page. A set of employees reporting to that manager would also be placed on the page within a list box. The set of employees depicted in the list box is actually the visualization of a pre-defined relationship between a source (the manager) and multiple targets (the reporting employees) captured through the semantic model 45. As the template is created model 45 is able to recognize that the manager in the textbox and the source manager in the list set are actually the same item.

Further, a new manager or employee can be added, removed, or modified interactively in the presentation and immediately and automatically refreshed in any visual placeholder affected by the change.

In accordance with the foregoing description of the exemplary embodiments, and in accordance with one approach, a user takes an action (e.g., a drag and drop operation) and the user interface passes the action to the Model 45. The Model 45 then computes the effects on the Content model 46 and on the depictions, and then notifies the user interface of depiction changes.

In another exemplary approach, a user takes an action (e.g., a drag and drop operation) and the user interface immediately responds, changing the directly-affected depiction(s). The user interface then passes the action and/or the changed depictions and/or a representation of the change details (e.g., a delta) to the Model 45 The Model 45 computes the effects on the Content model 46 and the depictions and the Model 45 then notifies the user interface of further depiction changes (if any). This latter approach allows the user interface to perform immediate, local operations, with the Model 45 catching up later to enforce consistency.

Thus, in this latter alternative the user interface can respond immediately to a user action, change the depiction(s) that are immediately affected, and then pass information to the Model 45 (e.g., a representation of the action and/or the changed depictions and/or the representation of the change details (e.g., a delta)). The Model 45 can then determine what further changes are needed to ensure consistency, make them, and notify the user interface of the changes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, web technologies such as Dojo (The Dojo Foundation) and Flex (Adobe Systems Incorporated), and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application thereof, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent model types and model elements may be used by those skilled in the art. However, all such and similar modifications of the teachings of this invention will still fall within the scope of this invention.

What is claimed is:

1. A computer-implemented method to create a presentation comprised of at least one sheet, each sheet containing one or more visual elements, comprising:
    in response to input from a user, representing visual elements as depictions in a model, where the model is comprised of a visual model that operates with a view layer, a content model, and a mapping model that provides mapping rules between contents of the visual model and the content model, where each depiction depicts an item in the model, where each item is a unit of information with a unique identifier, where each item can be depicted by at least one depiction and each depiction defines the visual representation of the item's information via the visual element;
    for a case where the presentation is comprised of a plurality of sheets, and in response to a change to an item made by altering the visual element in the view layer that is associated with the depiction of the item, operating the model to perform computation in accordance with stored machine executable instructions so as to automatically propagate the change to the item to all other occurrences of depictions of the item across all sheets of the plurality of sheets of the presentation; and
    further operating the model for automatically updating the associated visual elements to reflect the change to the item.

2. The method of claim 1, where an item can be a member of at least one set in the model.

3. The method of claim 1, where an item can comprise a single item, a set of items, or a set of sets.

4. The method as in claim 1, where a depiction can comprise one of a text box, a list, a table, a diagram, or a chart.

5. The method as in claim 1, where an item can be a member of at least one set in the model, and a sheet containing a depiction of the item can be transformed into a template based on a set membership of the item, where the template can be applied to any other member of the set of which the item is a member.

6. The method as in claim 5, further comprising using the template to automatically generate a sheet for each member of the set.

7. The method of claim 1, where a user interface of a presentation application that creates the presentation provides two dedicated separate visual display areas for sheets, one visual display area being for work-book sheets and another visual display area being for presentation-book sheets.

8. The method of claim 7, where an item can be a member of at least one set in the model, and where for a sheet, in either a presentation-book or in a work-book, containing a depiction, transforming the sheet into a template based on a set membership of the item associated with the depiction, and using the template to automatically generate a sheet for each member of the set, either in a presentation-book or in a work-book.

9. The method of claim 1, where an auto-completion selector is associated with an element enabling a user to select, via a user interface of a presentation application that creates the presentation, at least one existing item from the model for adding to a sheet being composed by the user.

10. A non-transitory computer-readable medium that stores machine executable instructions, where execution of the instructions results in performing operations that comprise:
    creating a presentation comprised of at least one sheet, each sheet containing one or more visual elements, where in response to input from a user, representing visual elements as depictions in a model, where the model is comprised of a visual model that operates with a view layer, a content model, and a mapping model that provides mapping rules between contents of the visual model and the content model, where each depiction depicts an item in the model, where each item is a unit of information with a unique identifier, where each item can be depicted by at least one depiction and each depiction defines the visual representation of the item's information via the visual element;
    for a case where the presentation is comprised of a plurality of sheets, and in response to a change to an item made by altering the visual element in the view layer that is associated with the depiction of the item, operating the model to perform computation in accordance with the stored machine executable instructions so as to automatically propagate the change to the item to all other occurrences of depictions of the item across all sheets of the plurality of sheets of the presentation; and
    further operating the model for automatically updating the associated visual elements to reflect the change to the item.

11. The computer-readable medium of claim 10, where an item can be a member of at least one set in the model.

12. The computer-readable medium of claim 10, where an item can comprise a single item, a set of items, or a set of sets.

13. The computer-readable medium of claim 10, where a depiction can comprise one of a text box, a list, a table, a diagram, or a chart.

14. The computer-readable medium of claim 10, where an item can be a member of at least one set in the model, and further comprising an operation, for a sheet containing a depiction of the item, of transforming the sheet into a template based on a set membership of the particular item, where the template can be applied to any other member of the set of which the item is a member.

15. The computer-readable medium of claim 14, further comprising an operation of using the template to automatically generate a sheet for each member of the set.

16. The computer-readable medium of claim 10, where a user interface of a presentation application that creates the presentation provides two dedicated separate visual display areas for sheets, one visual display area being for work-book sheets and another visual display area being for presentation-book sheets.

17. The computer-readable medium of claim 16, where an item can be a member of at least one set in the model, and where for a sheet, in either a presentation-book or in a work-book, containing a depiction, transforming the sheet into a template based on a set membership of the item associated with the depiction, and using the template to automatically generate a sheet for each member of the set, either in a presentation-book or in a work-book.

18. The computer-readable medium of claim 10, where an auto-completion selector is associated with an element enabling a user to select, via a user interface of a presentation application that creates the presentation, at least one existing item from the model for adding to a sheet being composed by the user.

19. A system configured to execute a presentation application to create a presentation comprised of at least one sheet, each sheet containing one or more visual elements, the system comprising at least one data processor coupled with at least one non-transitory computer-readable medium that stores machine executable instructions, where execution of the instructions by the at least one data processor results in performing operations that comprise:

in response to receiving input generated by a user with a user interface coupled to the at least one data processor, representing visual elements that are displayable to the user via the user interface as depictions in a model, where the model is configured in at least one storage medium so as to be comprised of a visual model that operates with a view layer, a content model, and a .mapping model that provides mapping rules between contents of the visual model and the content model, where each depiction depicts a single item in the model, where each item is a unit of information with a unique identifier, where each item can be depicted by at least one depiction and each depiction defines the visual representation of the item's information via the visual element;

for a case where the presentation is comprised of a plurality of sheets, and in response to a change to an item made by altering the visual element in the view layer that is associated with the depiction of the item, operating the model to perform computation in accordance with the stored machine executable instructions so as to automatically propagating propagate the change to the item to all other occurrences of depictions of the item across all sheets of the plurality of sheets of the presentation; and further operating the model for automatically updating the associated visual elements to reflect the change to the item.

20. The system of claim 19, where an item can be a member of at least one set in the model and can comprise a single item, a set of items, or a set of sets, where a depiction can comprise one of a text box, a list, a table, a diagram, or a chart.

21. The system of claim 19, where an item can be a member of at least one set in the model and further comprising, for a sheet containing a depiction of the item, an operation of transforming the sheet into a template based on a set membership of the particular item, where the template can be applied to any other member of the set of which the item is a member, and an operation of using the template to automatically generate a sheet for each member of the set.

22. The system of claim 19, where the user interface provides two dedicated separate visual display areas for sheets, one visual display area being for work-book sheets and another visual display area being for presentation-book sheets, where an item can be a member of at least one set in the model, and where for a sheet, in either a presentation-book or in a work-book, containing a depiction, transforming the sheet into a template based on a set membership of the item associated with the depiction, and using the template to automatically generate a sheet for each member of the set, either in a presentation-book or in a work-book.

* * * * *